United States Patent [19]

Iwamura

[11] Patent Number: 5,524,090

[45] Date of Patent: Jun. 4, 1996

[54] APPARATUS FOR MULTIPLYING LONG INTEGERS

[75] Inventor: Keiichi Iwamura, Kawasaki, Japan

[73] Assignee: Canon Kabushiki Kaisha, Tokyo, Japan

[21] Appl. No.: 512,620

[22] Filed: Aug. 8, 1995

Related U.S. Application Data

[63] Continuation of Ser. No. 79,748, Jun. 22, 1993, abandoned.

[30] Foreign Application Priority Data

| Jun. 25, 1992 | [JP] | Japan | 4-167077 |
| Jun. 25, 1992 | [JP] | Japan | 4-167078 |
| Jun. 25, 1992 | [JP] | Japan | 4-167079 |
| Jun. 25, 1992 | [JP] | Japan | 4-167080 |
| Jun. 25, 1992 | [JP] | Japan | 4-167081 |
| Jun. 25, 1992 | [JP] | Japan | 4-167082 |
| Jun. 25, 1992 | [JP] | Japan | 4-167083 |
| Jun. 25, 1992 | [JP] | Japan | 4-167084 |

[51] Int. Cl.$^6$ .................................................. G06F 7/52

[52] U.S. Cl. ............................................ 364/757; 364/754

[58] Field of Search ............................ 364/754, 757–759

[56] References Cited

U.S. PATENT DOCUMENTS

| 2,672,283 | 3/1954 | Havens . | |
| 4,493,048 | 1/1985 | Kung et al. | 364/754 |
| 4,777,614 | 10/1988 | Ward | 364/754 |
| 4,811,269 | 3/1989 | Hirose et al. . | |
| 4,939,687 | 7/1990 | Hartley et al. | 364/757 |
| 5,117,385 | 5/1992 | Gee | 364/757 |
| 5,181,184 | 1/1993 | Shim et al. | 364/757 |
| 5,262,975 | 11/1993 | Ohki | 364/757 |
| 5,274,832 | 12/1993 | Khan | 364/754 |

OTHER PUBLICATIONS

R. Richards, "Arithmetic Operations In Digital Computers", 1955, pp. 155–160.

1990 IEEE International Symposium On Circuits And Systems, May 1–3, 1990, vol. 2, 1990, IEEE, New York, U.S.A., pp. 1248–1251, Xingcha Fan et al., "Data Formats And Arithmetic Operators For Serial/ Parallel Trade-Offs In Pipelined Architectures".

IEE Proceedings, E. Computers & Digital Techniques, vol. 135, No. 5, Sep. 1988, pp. 259–265, L. Ciminiera et al., "Low cost serial multipliers for high-speed specialised processors".

Nachrichten Elektronik, vol. 36, No. 2, Feb. 1982, pp. 75–78, V. Leesemann, "Seriell/Parallel-Multiplizierer für die digitale Signalverarbeitung, Teil 1".

Patent Abstracts of Japan, vol. 3, No. 25, published Feb. 28, 1979, English Abstract of Japanese Patent No. 54–3441.

Primary Examiner—Tan V. Mai
Attorney, Agent, or Firm—Fitzpatrick, Cella, Harper & Scinto

[57] ABSTRACT

A multiplier apparatus designed to multiply integers of many figures with a small circuit scale in such a manner that an input value is partitioned and multiplication is performed by taking account of carries. With respect to partitioned input values, partial multiplications are repeatedly performed in parallel with each other, and results of the partial multiplications are added by a plurality of adders. A carry occurring at each adder is added in the same adder or in an upper adder in the next cycle of addition. A circuit for this operation may be formed as a systolic array of identical processing elements to perform the operation in a pipe line processing manner.

10 Claims, 18 Drawing Sheets

APPARATUS FOR MULTIPLYING LONG INTEGERS

This application is a continuation, of application Ser. No. 08/079,748 filed Jun. 22, 1993, now abandoned.

BACKGROUND OF THE INVENTION

1. Field of the Invention

This invention relates to a multiplier apparatus for multiplying integers and, more particularly, to an multiplier apparatus which is suitable for a cryptographic scheme using a cryptographic system such as the RSA cryptosystem, and which multiplies integers of many figures by utilizing multiplication of a small number of figures.

2. Description of the Related Art

Recently, with the rapid development of information communication systems using computer networks, the importance of cryptographic schemes for data protection has increased.

There are two kinds of cryptosystems: public-key cryptosystems and common-key cryptosystems. Unlike common-key cryptosystems, public-key cryptosystems are advantageous in that key management is easy and digital signature is possible. In the RAS cryptosystem, which is typical of public-key cryptosystems, a cryptogram is calculated by a modular exponentiation: $C=M^e \bmod N$ (C, M, N, e: integers). The modular exponentiation is realized by repeating a modular multiplication: $D=A \cdot B \bmod N$ (A, B, D: integers). To ensure security against cryptanalysis, 512 bits or more are required for the values N and e. In such a case, the computational complexity is very high.

To directly execute the above-described calculation, a multiplier and a divider having many places are required. In gate array design or board design, a multiplier for multiplying integers of a small number of figures can be easily arranged because suitable cell libraries, transistor-transistor logic (TTL) devices and the like are available. However, there have been provided no ROMs and no cell libraries for realizing a multiplier and a divider of many places. It has been difficult to design a multiplier or a divider of many places in accordance with one's need, because the circuit configuration is very complicated if the configuration of a multiplier or a divider of a small number of places is simply extended.

Then, a multiplication may be performed by partitioning an input value with respect to a predetermined number of bits. In a calculation system such as a Galois field using no carry, a multiplication can be executed by a circuit such as that shown in FIG. 2. The circuit shown in FIG. 2 has (m×m)-bit multipliers ×Bi on a Galois field having m-bit values Bi (i=1, ..., n−1) as multiplier factors, m-bit EXOR devices EX, and m-bit registers r.

In the case of an ordinary multiplication of integers performed by separate operations of such a circuit, however, a carry occurs when each separate operation is performed. It is therefore difficult to form an efficient multiplication apparatus by using this circuit.

SUMMARY OF THE INVENTION

In view of the above-described problems, an object of the present invention is to provide a multiplier apparatus capable of efficiently multiplying integers of many figures with a small-scale circuit.

Another object of the present invention is to provide a multiplier apparatus for multiplying integers of many figures by utilizing multiplication of integers of a small number of figures.

Still another object of the present invention is to provide a multiplier apparatus= for efficiently performing a multiplication by taking account of carries in a case where integers of many figures are multiplied by partitioning an input value.

A further object of the present invention is to provide a multiplier apparatus for multiplying integers of many figures which is formed of a plurality of identical processing elements, and which can be suitably formed as an integrated circuit.

According to one aspect, the present invention which achieves these objectives relates to a multiplier apparatus for multiplying n-bit first data representing a first integer and (n×m)-bit second data representing a second integer, the apparatus comprising input means for successively inputting the first data bit by bit from an upper place, a plurality of multiplication means each for multiplying input 1 bit and one of groups of m bits of the second data partitioned with respect to m bits each time 1 bit of the first data is input by the input means, a plurality of memory means, and a plurality of addition means each for adding an output from one of the plurality of multiplication means, lower bits of a value stored in one of the plurality of memory means, and upper bits of a value stored in another one of the plurality of memory means, and for outputting a result of the addition to still another one of the plurality of memory means.

According to another aspect, the present invention which achieves the objectives relates to a multiplier apparatus for multiplying (n×m)-bit first data representing a first integer and (n×m)-bit second data representing a second integer, the apparatus comprising input means for successively inputting the first data m bits at a time from an upper place, a plurality of multiplication means each for multiplying input m bits and one of groups of m bits of the second data partitioned with respect to m bits each time m bits of the first data are input by the input means, a plurality of memory means, and a plurality of addition means each for adding an output from one of the plurality of multiplication means, lower bits of a value stored in one of the plurality of memory means, and upper bits of a value stored in another one of the plurality of memory means, and for outputting a result of the addition to still another one of the plurality of memory means.

According to still another aspect, the present invention which achieves the objectives relates to a multiplier apparatus for multiplying (n×m) -bit first data representing a first integer and (n×m)-bit second data representing a second integer, the apparatus comprising input means for successively inputting the first data m bits at a time from a lower place, a plurality of multiplication means each for multiplying input m bits and one of groups of m bits of the second data partitioned with respect to m bits each time m bits of the first data are input by the input means, a plurality of first memory means, a plurality of addition means each for adding an output from one of the plurality of multiplication means, lower bits of a value stored in one of the plurality of first memory means, and upper bits of a value stored in another one of the plurality of memory means, and for outputting a result of the addition to still another one of the plurality of memory means, and a plurality of second memory means for storing a carry output from one of the plurality of addition means and for feeding back the carry to the addition means which has output the carry at the time of a subsequent addition.

According to yet another aspect, the present invention which achieves the objectives relates to a multiplier apparatus for multiplying (n×m)-bit first data representing a first integer and (n×m)-bit second data representing a second integer, the apparatus comprising input means for successively inputting the first data m bits at a time from an upper place, a plurality of multiplication means each for multiplying input m bits and one of groups of m bits of the second data partitioned with respect to m bits each time m bits of the first data are input by the input means, a plurality of memory means, and a plurality of addition means each for adding an output from one of the plurality of multiplication means, lower bits of a value stored in one of the plurality of memory means, and upper bits of a value stored in another one of the plurality of memory means, and for outputting a result of the addition to the memory means which has stored the added lower bits.

According to a further aspect, the present invention which achieves the objectives relates to a multiplier apparatus for multiplying (n×m)-bit first data representing a first integer and (n×m)-bit second data representing a second integer, the apparatus comprising input means for successively inputting the first data m bits at a time from an upper place, a plurality of multiplication means each for multiplying input m bits of the first data and each of groups of m bits of the second data partitioned with respect to m bits each time m bits of the first data are input by the input means, a plurality of memory means, and a plurality of addition means each for adding a lower-m-bit output from one of the plurality of multiplication means, an upper-m-bit output from another one of the plurality of multiplication means, lower bits of a value stored in one of the plurality of memory means, and upper bits of a value stored in another one of the plurality of memory means, and for outputting a result of the addition to the memory means which has stored the added lower bits.

According to still still a further aspect, the present invention which achieves the objectives relates to a multiplier apparatus for multiplying (n×m)-bit first data representing a first integer and (n×m)-bit second data representing a second integer, the apparatus comprising a set of p operational circuits, each of the p operational circuit including input means for successively inputting the first data m·p bits at a time from a lower place as a set of p groups of m-bit data in parallel with each other, a plurality of multiplication means each for multiplying one of the set of p groups of input m-bit data and one of p groups of data in the second data grouped from data items partitioned from the second data with respect to m bits, a plurality of memory means, and a plurality of addition means. Each of the plurality of addition means adds a result of addition of a preceding one of the addition means stored in the corresponding one of the plurality of memory means and outputs from the corresponding two of the plurality of multiplication means each multiplying a series of bits in the second data. The addition means outputs a result of the addition to another one of the plurality of memory means. Obtained multiplication results are successively output by the lowermost addition means in the groups of p operational circuits.

According to still a further aspect, the present invention which achieves the objectives relates to a multiplier apparatus for multiplying (n×m)-bit first data representing a first integer and (n×m)-bit second data representing a second integer, the apparatus comprising n identical processing elements connected one-dimensionally. Each of groups of m bits in the first data partitioned with respect to m bits is input to the corresponding one of the n processing elements. The second data is successively input m bits at a time from an upper place to the processing element at the uppermost stage. Each of the processing elements successively receives results of an operation of the processing element at an upper stage and the groups of m bits of the second data from the upper-stage processing element, multiplies each of the groups of m bits of the second data successively received and the corresponding one of the input groups of m bits of the first data, adds the product of the multiplication to the upper-stage processing element, and successively outputs results of the addition and the groups of m bits of the successively received second data to the processing element at a lower stage. Obtained multiplication results are successively output from the processing element at a lowermost stage.

According to still a further aspect, the present invention which achieves the objectives relates to a multiplier apparatus for multiplying (n×m)-bit first data representing a first integer and (n×m)-bit second data representing a second integer, the apparatus comprising n×n identical processing elements connected in a two-dimensional array having n rows and n columns. Each of groups of m bits in the first data partitioned with respect to m bits is input to the processing elements in the corresponding one of the n columns of the n row×n column array. Each of groups of m bits in the second data partitioned with respect to m bits is input to the corresponding one of the processing elements in the first column. Each of the processing elements successively receives the group of m bits of the second data from the same-row preceding-column processing element and a processing result from the preceding-row preceding-column processing element, multiplies each of the group m bits of the second data successively received and the corresponding one of the input groups of m bits of the first data, adds the product of the multiplication and a processing result successively received from the same-row preceding-column processing element, and successively outputs the added processing result to the next-row next-column processing element and the successively received m bits of the second data to the same-row next-column processing element. Obtained multiplication results are output from the processing elements in the final column and the final row.

Other objectives and advantages besides those discussed above shall be apparent to those skilled in the art from the description of preferred embodiments of the invention which follow. In the description, reference is made to accompanying drawings, which form a part thereof, and which illustrate examples of the invention. Such examples, however, are not exhaustive of the various embodiments of the invention, and therefore reference is made to the claims which follow the description for determinating the scope of the invention.

DESCRIPTION OF THE PREFERRED EMBODIMENTS

Figure 1:
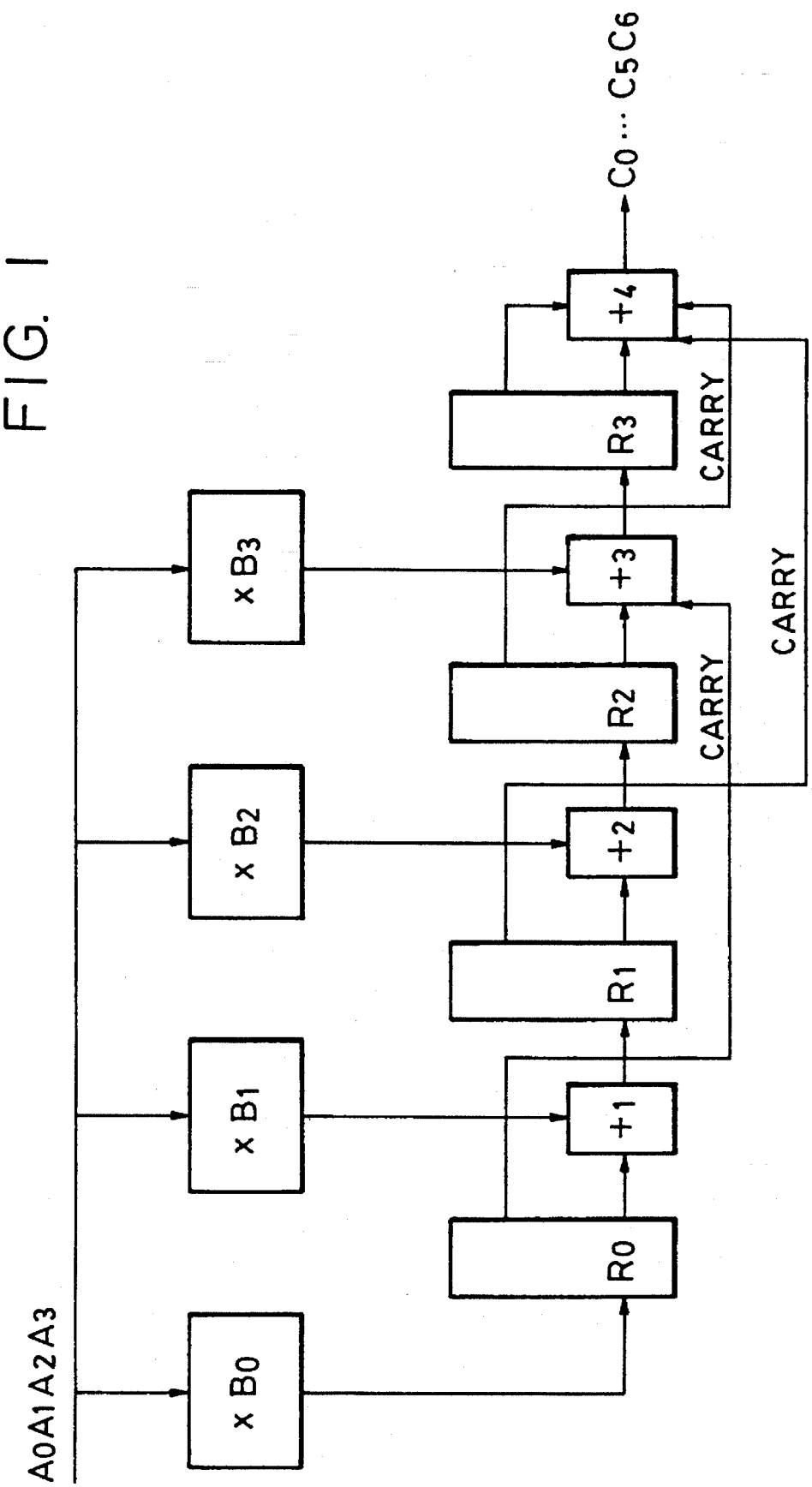
FIGS. 1, 3, 4, 7 to 10, and 12 are diagrams of examples of multiplier circuits in accordance with embodiments of the present invention.

The preferred embodiments of the present invention will be described below with reference to the accompanying drawings.

[Embodiment 1]

Let m, A, and B be a small integer, an integer of n bits, and an integer of h·m bits, respectively. For ease of explanation, h=n is assumed in the following. The generality is not lost by this limitation. Practice of an operation: A·B=C will be discussed. As is well known, a multiplier for executing multiplication of an integer a of one bit and an integer b of m bits, i.e., a·b=c, can be realized by using AND circuits or the like.

Integers A and B can be expressed as shown below by being partitioned with respect 1 bit and m bits, respectively.

$$A=A_{n-1} \cdot 2^{n-1}+A_{n-2} \cdot 2^{n-2}+\ldots+A_1 \cdot 2+A_0$$

$$B=B_{n-1} \cdot X^{n-1}+B_{n-2} \cdot X^{n-2}+\ldots+B_1 \cdot X+B_0$$

$$X=2^{m-1}$$

Partitioned n terms in the equation of A form a bit series $A_{n-1}, A_{n-2}, \ldots, A_0$ from an upper place to a lower place. B is also expressed in the same manner. In this case, A and B are regarded as polynominals and A·B can therefore be expressed as shown below.

$$A \cdot B = A_{n-1} \cdot B \cdot 2^{n-1}+A_{n-2} \cdot B \cdot 2^{n-2}+\ldots+A_1 \cdot B \cdot 2+A_0 \cdot B$$

A case where n=4 will be discussed. The generality is not lost by this limitation.

$$A \cdot B = A_3 \cdot (B_3 \cdot X^3 + B_2 \cdot X^2 + B_1 \cdot X + B_0) \cdot 2^3 \quad (1)$$

$$+ A_2 \cdot (B_3 \cdot X^3 + B_2 \cdot X^2 + B_1 \cdot X + B_0) \cdot 2^2 \quad (2)$$

$$+ A_1 \cdot (B_3 \cdot X^3 + B_2 \cdot X^2 + B_1 \cdot X + B_0) \cdot 2 \quad (3)$$

$$+ A_0 \cdot (B_3 \cdot X^3 + B_2 \cdot X^2 + B_1 \cdot X + B_0) \quad (4)$$

To execute this operation, a multiplier circuit such as that shown in FIG. 1 is formed. The arrangement of the multiplier circuit shown in FIG. 1 corresponds to a case where $A_i$ (i=n−1, ..., 0) represents 1-bit units while $B_i$ represents m-bit units. The circuit shown in FIG. 1 is formed of four (1×m)-bit multipliers (×$B_0$ to ×$B_3$), four m-bit full adders with a 2-bit carry (+$_1$ to +$_4$), and four (m+2)-bit registers ($R_0$ to $R_3$). In the initial state, the content of each register in the circuit shown in FIG. 1 is "0". Also, the values of $B_i$ are set; in the multipliers (×$B_i$) prior to inputting Ai.

When $A_3$ is input by a first clock pulse, the coefficient $A_3 \cdot B_i$ (i=3, ..., 0) of each sub-term in the term (1) is output from the corresponding multiplier and is stored in the corresponding register through the full adder.

When $A_2$ is input by the next clock pulse, the coefficient $A_2 \cdot B_i$ (i=3, ..., 0) of each sub-term in the term (2) is output from the corresponding multiplier. Since the term (1) is greater than the term (2) one place in binary notation, the values stored in the registers are shifted up one bit, and the shifted values and the outputs from the multipliers representing the coefficients of the terms (2) are added to each other. Accordingly, lower m−1 bits in each register are shifted up one bit and feedback-input to the adder, and the mth bit in each register is input to the least significant bit of the adjacent adder on the right side. In each adder, therefore, two groups of m bits are added to each other. If there is a carry, m+1 bits are output and stored in the register again.

The same operation as that performed when $A_2$ is input is also performed when $A_1$ is input by the next clock pulse. At this time, however, a carry bit as the (m+1)th bit in each register is input as a carry to the second place in the adjacent adder on the right side. That is, the (m+1)th bit in each register has the same place as the least significant bit in the adjacent register on the right side and, therefore, needs to be treated as a second-place carry bit instead of a lowermost-place carry bit in the adder. Accordingly, m+2 bits are output from each adder and stored in the register again. Thus, the coefficients of the sub-terms in the terms (1) to (3) are added.

When $A_0$ is finally input by the next clock pulse, the coefficients of the sub-terms in the terms (1) to (4) are added by the same operation, thus performing the multiplication A·B. Subsequently, inputting clock pulses may be continued to output the multiplication result A·B successively from the upper place, from the upper bit of the uppermost-place register, or the content of each register may be read out to form the final multiplication result A·B. In this manner, the operation A·B is performed efficiently as partitioned values of A are input.

It is apparent that the full adders having carries in the arrangement shown in FIG. 1 can be realized by a combination of a plurality of two-input full adders and half adders. It is also apparent that a multiplier circuit for achieving the same effect can also be formed by removing the right-end register or by further annexing a full adder and a register.

The arrangement of the same processing elements each consisting of a multiplier (×$B_j$), a full adder (+$_j$) and a registers ($R_j$), such as those shown in FIG. 1, is also advantageous in that a large-scale circuit such as a VLSI can be easily realized thereby. It is also apparent that the same operational result can be obtained by using a memory having a plurality of regions $R_j$ and by performing operations corresponding to the above-described processing elements successively or parallel to each other on the basis of a software process.

[Embodiment 2]

With respect to the following embodiments, examples of multiplier circuits in which A is also partitioned with respect to m bits will be described.

Let m, A, and B be a small integer, an integer of n bits, and an integer of h·m bits, respectively. For ease of explanation, h=n is assumed in the following. The generality is not lost by this limitation. Practice of an operation: A·B=C will be discussed. A multiplier for executing multiplication of an integer a of one bit and an integer b of m bits, i.e., a·b=c, can be easily realized by using a cell library, a transistor-transistor logic or the like.

Integers A and B can be expressed as shown below by being partitioned with respect m bits.

$$A=A_{n-1} \cdot X^{n-1}+A_{n-2} \cdot X^{n-2}+\ldots+A_1 \cdot X+A_0$$

$$B=B_{n-1} \cdot X^{n-1}+B_{n-2} \cdot X^{n-2}+\ldots+B_1 \cdot X+B_0$$

$$X=2^{m-1}$$

Partitioned n terms in the equation of A form a bit series $A_{n-1}, A_{n-2}, \ldots, A_0$ from an upper place to a lower place. B is also expressed in the same manner. In this case, A and B are regarded as polynominals and A·B can therefore be expressed as shown below.

$$A \cdot B = A_{n-1} \cdot X^{n-1} \cdot B + A_{n-2} \cdot X^{n-2} \cdot B + \ldots + \quad (5)$$
$$A_1 \cdot X \cdot B + A_0 \cdot B$$
$$= A_{n-1} \cdot B_{n-1} \cdot X^{2n-2} + (A_{n-1} \cdot B_{n-2} + A_{n-2} \cdot B_{n-1}) \cdot$$
$$X_{2n-3} + \ldots + (A_1 \cdot B_0 + A_0 \cdot B) \cdot X + A_0 \cdot B_0$$
$$= \sum_{k=n}^{2n-2} \left( \sum_{i=k-(n-1)}^{n-1} A_i \cdot B_{k-i} \right) \cdot$$
$$X^k + \sum_{k=0}^{n-1} \left( \sum_{i=0}^{k} A_i \cdot B_{k-i} \right) \cdot X^k$$
$$= \sum_{k=0}^{2n-2} C_k \cdot X^k$$

Figure 3:
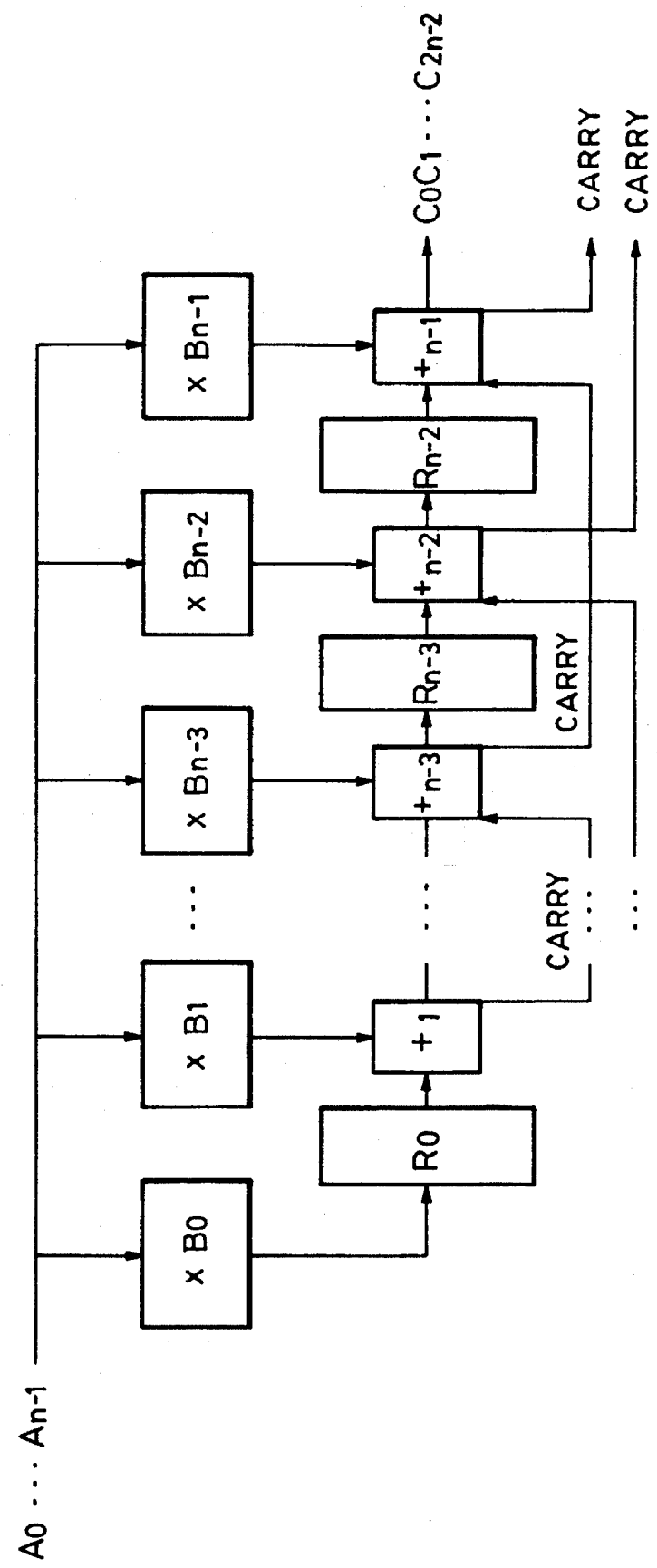

To execute this operation, the multiplier circuit may be arranged as shown in FIG. 3. That is, the multiplier circuit is formed of n multipliers ($\times B_0$ to $\times B_{n-1}$) for executing multiplication a·b=c of groups of m bits, n−1 2m-bit adders with a carry ($+_1$ to $+_{n-1}$, hereinafter referred to as full adders), n−1 2m-bit registers ($R_0$ to $R_{n-2}$), and carry lines each of which connects adders $+_i$ and $+_{i+2}$ by jumping one adder placed therebetween.

In the initial state, the content of each register in the circuit shown in FIG. 3 is "0".

When $A_{n-1}$ is input by a first clock pulse, the coefficient $C_{2n-2}$ ($=A_{n-1}\cdot B_{n-1}$) of $X^{2n-2}$ designating the uppermost place is output from the full adder ($+_{n-1}$), and $A_{-1}\cdot B_i$ (i=n−2, ..., 0) is stored in each register.

When $A_{n-2}$ is input by a first clock pulse, the sum of the output $A_{n-1}\cdot B_{n-2}$ from the right-end register ($R_{n-2}$) and the output $A_{n-2}\cdot B_{n-1}$ from the multiplier $\times B_{n-1}$, i.e., $C_{2n-3}$ ($=A_{n-1}\cdot B_{n-2}+A_{n-2}\cdot B_{n-1}$) is output from the full adder ($+_{n-1}$) of the circuit shown in FIG. 3. This output corresponds to the coefficient of $X_{2n-3}$ designating the next place. Simultaneously, a carry from each full adder to the next but one full adder on the right side is calculated. In the arrangement shown in FIG. 3, a carry from the second nearest full adder on the left side is added to the least significant bit. That is, with respect to $A_i$ and $B_i$ of m bits, the output ($A_{n-1}\cdot B_{n-2}+A_{n-2}\cdot B_{n-1}$) represents a 2m-bit unit corresponding to $X^2$, while one clock cycle corresponds to a unit of X. A carry is therefore made by jumping one full adder. In each register, ($A_{n-1}\cdot B_{i-1}+A_{n-2}\cdot B_i$) which is the sum of the output from the subordinate register and the output from the multiplier is stored.

It can be understood that the multiplication result through the places to $X^{n-1}$ is output if the above-described operational steps are repeated by n clock pulses until $A_0$ is input. Thereafter, the same Operational steps are repeated while "0" is input by n clock pulses. The values in the registers are thereby successively output until the multiplication result is entirely output. In this manner, the operation A·B of integers A and B is performed efficiently as partitioned values of A are input.

The values n and m are determined by considering a balance between the operational speed of the multiplier circuit and the complexity of the circuit. If m is greater, the number of clock pulses is smaller and the operational speed is higher, but the circuit is complicate. Also, it can be understood that the circuit formed by arranging processor elements (PE) each consisting of a multiplier ($\times B_i$), a full adder ($+_i$) and a register ($R_i$) in accordance with this embodiment can be realized by annexing a full adder ($+_0$) corresponding to the multiplier ($\times B_0$) and a register ($R_{n-1}$) for storing the output from the full adder ($+_{n-1}$) to the circuit shown in FIG. 3.

It has been explained that a multiplier circuit of n·m bits can be realized efficiently by using multipliers of m×m bits in a case where an input value is supplied by being partitioned into n values with respect to m bits. It is apparent that a multiplication can also be executed with the same circuit even when h≠n. However, the output from the multiplier circuit in accordance with this embodiment, inclusive of carries, has a (2m+2)-bit form. It is natural that such carries are added to the forward output, but there is no problem if the multiplication result is processed by being partitioned with respect to several bits in a subsequent circuit, and if the output from the main circuit is used by recognizing this condition. On the contrary, the scale of the subsequent circuit arrangement can be reduced since a many-figure number can be processed part by part.

[Embodiment 3]

An example of a multiplier circuit in which no carry is made and in which each of full adders is provided with a buffer which feeds a value back to the full adder will be described below.

Figure 4:
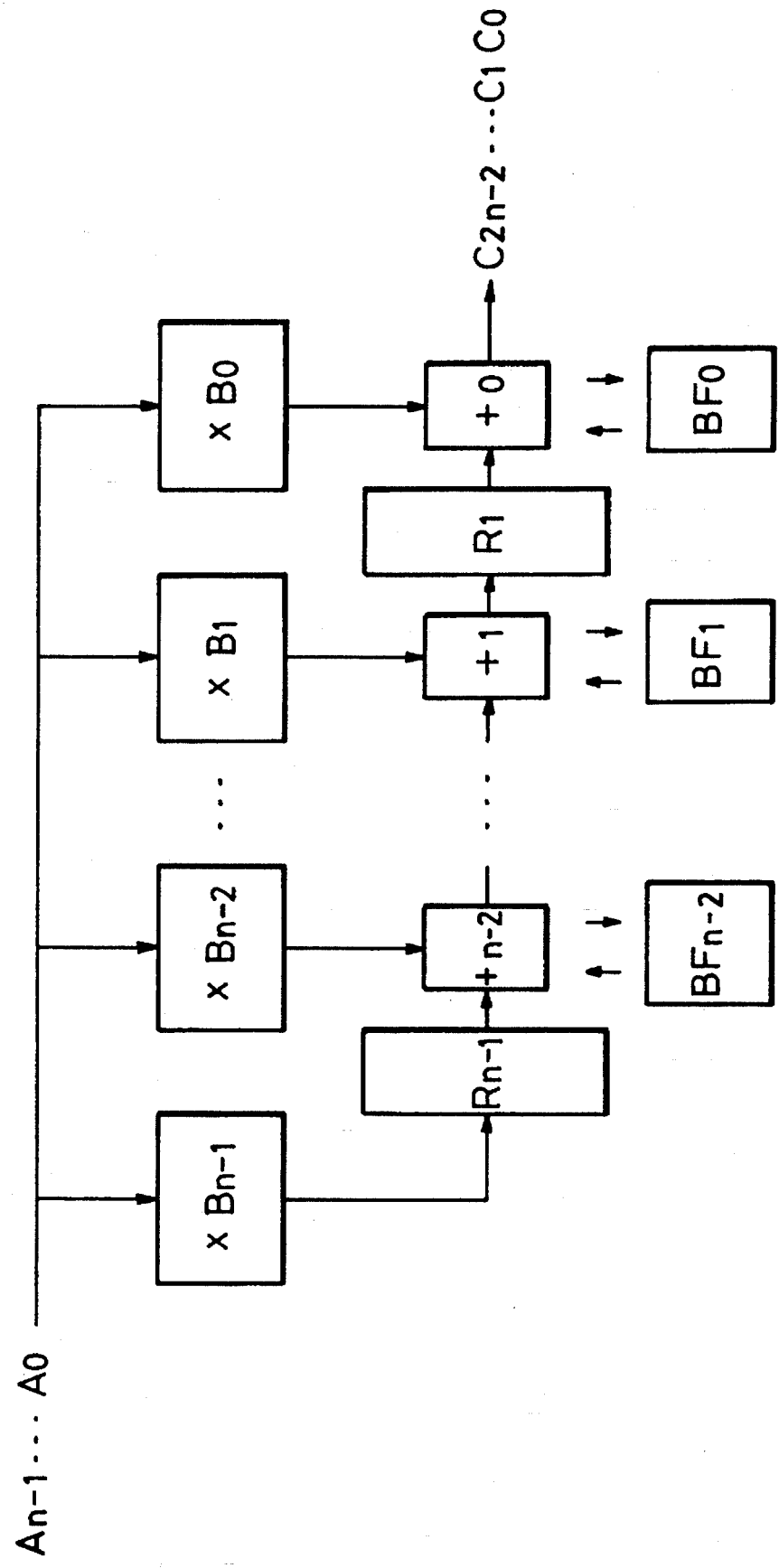

As shown in FIG. 4, the multiplier circuit is formed of n multipliers ($\times B_i$; i=n−1 ..., 0) for executing m-bit multiplication a·b=c, n−1 2m-bit adders with a carry (full adders) ($+_i$; i=n−2, ..., 0), n−1 2m-bit registers ($R_i$; i=n−1, ..., 1), and 2n−1 buffers ($BF_i$; i=n−2, ..., 0) for delaying a carry by 2 clock cycles.

When $A_0$ is input by a first clock pulse in the circuit shown in FIG. 4, $C_0$ ($=A_0\cdot B_0$) corresponding to the lowermost place is output, and $A_0\cdot Bi$ (i=n, ..., n−2) is stored in each register. The content of each register in the initial state is "0".

When $A_1$ is input by the next clock pulse, the sum of the output $A_0\cdot B_1$ from the right-end register and the output $A_1\cdot B_0$ from the right-end multiplier, i.e., $C_1$ ($=A_0\cdot B_1+A_1\cdot B_0$) is output. This output corresponds to the coefficient of X designating the next place. A carry of $A_0\cdot B_1+A_1\cdot B_0$ is stored in the 2-bit buffer $BF_0$ at the right end and used as a carry in an addition after two clock pulses. That is, the carry is calculated with a delay corresponding to two clock cycles because the output from the circuit shown in FIG. 4 becomes higher in place by X per clock pulse while $A_0\cdot B_1+A_1\cdot B_0$ represents a 2m-bit value, i.e., a value corresponding to $X^2$.

In each register $R_i$ and buffer $BF_i$, ($A_0\cdot B_i+A_1\cdot B_i$) which is the sum of the output from the register $R_{i+1}$ at the preceding stage and the output from the corresponding multiplier is stored together with its carry.

It can be understood that the multiplication result through the places to $X^{n-1}$ is output if the above-described operational steps are repeated by n clock pulses until $A_{n-1}$ is input. Thereafter, the same operational steps are repeated while "0" is input by n clock pulses. The values in the registers are thereby successively output until the multiplication result is entirely output.

Figure 5:
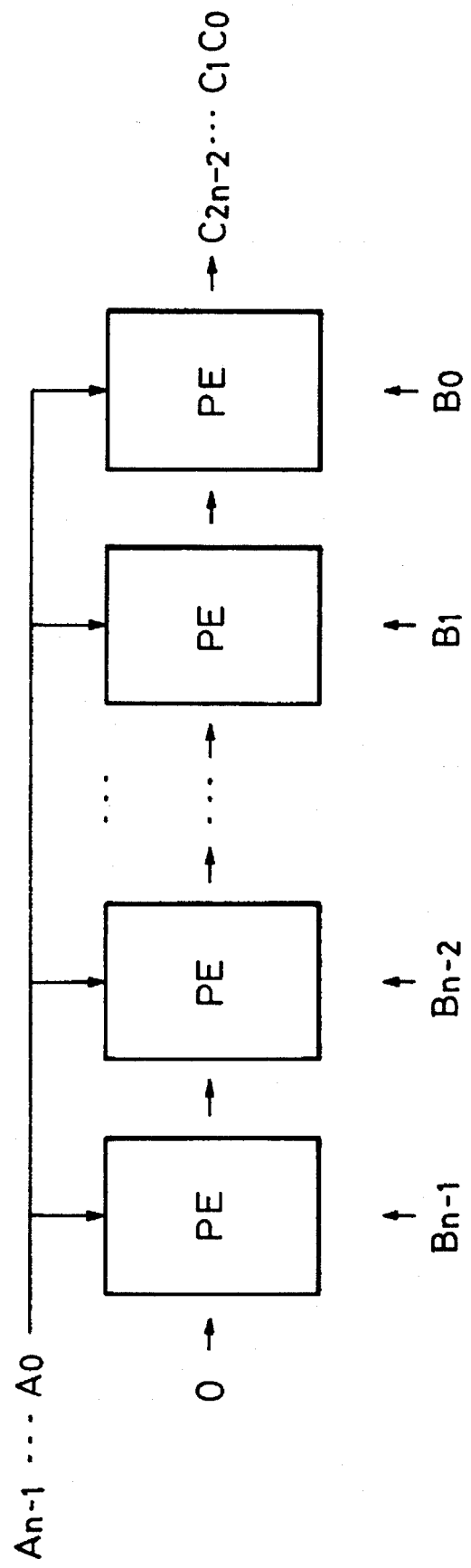
FIGS. 5, 13, 16, and 19 are diagrams of examples of multiplier circuits using the PEs.
Figure 6:
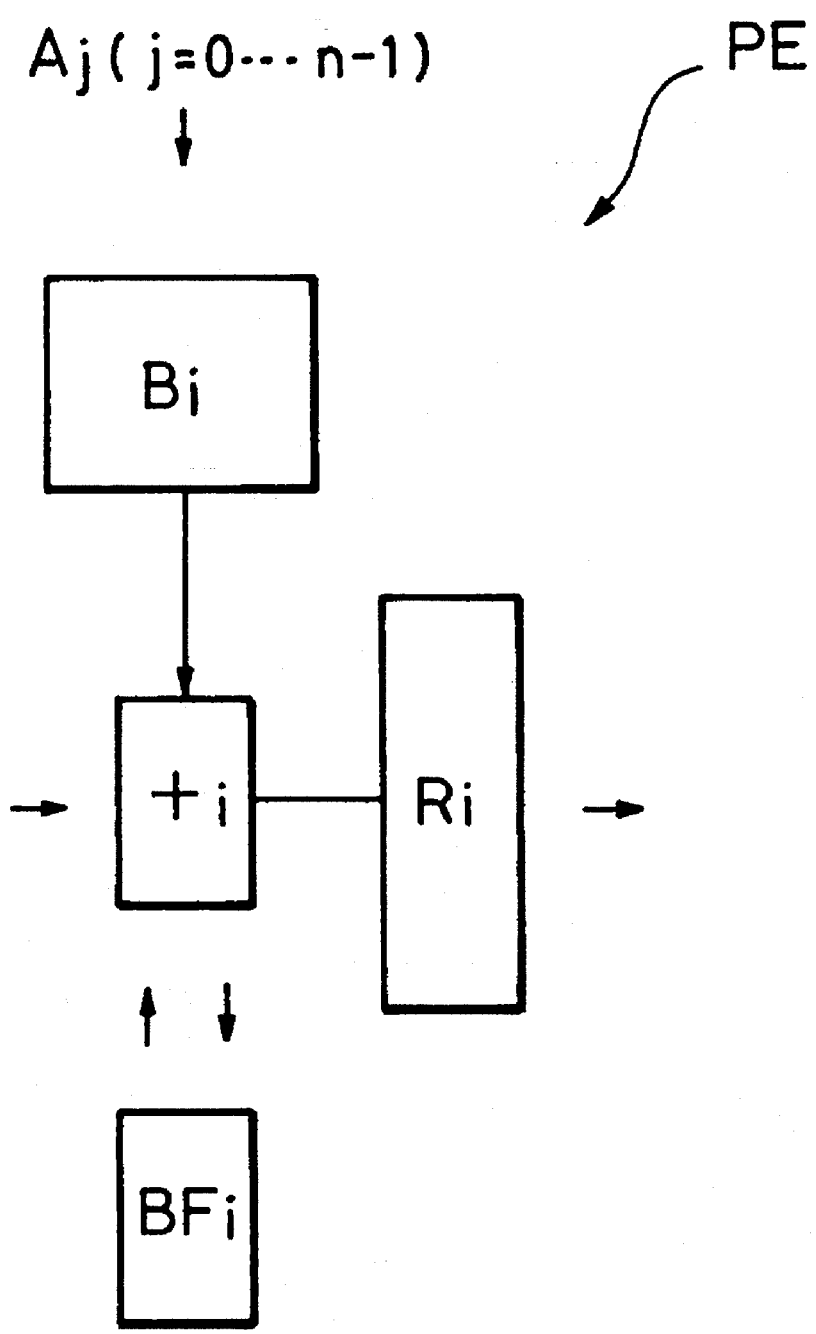
FIG. 6, 11, 14, 15, 17, and 18 are examples of circuit arrangements of processing elements (PE) for effecting multiplication.

Also, processing elements (PE) each consisting of a multiplier $B_i$, a full adder $+_i$, a buffer $BF_i$ and a register $R_i$ arranged as shown in FIG. 6 may be used. It is apparent that this embodiment can also be realized by parallel processing using such PEs as shown in FIG. 5.

Thus, the operation A·B is performed efficiently as partitioned values of A are successively input. It has been explained that a multiplier circuit of n·m bits can be realized efficiently by using multipliers of m×m bits in a case where an input value is supplied by being partitioned into n values with respect to m bits. It is apparent that a multiplication can also be executed with the same circuit even when h≠n.

In this system, a circuit portion for making a carry with a full adder forms a closed loop by a feedback using a buffer, and the problem of a delay relating to a carry, encountered in multiplication of integers, can therefore be avoided.

It is also apparent that the output from the circuit shown in FIG. 4 or 5, which represents a 2m-bit unit, can be formed as an m-bit output by using such a full adder with a buffer. That is, the arrangement may be such that upper m bits in a series of 2m bits are input to an m-bit register and are then input to an m-bit full adder, lower m bits are directly input to the full adder, and a carry is fed back to the full adder with a 1-bit delay.

The arrangement of the same processing elements, such as those shown in FIG. 5 or 6, is also advantageous in that a large-scale circuit such as a VLSI can be easily realized thereby.

[Embodiment 4]

A multiplier circuit arranged to directly add 2m-bit outputs for the purpose of simplifying the circuit arrangement will be described below.

For ease of explanation, a case where n=4 in the equation (5) will be discussed. The generality is not lost by this limitation.

$$A \cdot B = A_3 \cdot (B_3 \cdot X^6 + B_2 \cdot X^5 + B_1 \cdot X^4 + B_0 \cdot X^3) \quad (6)$$

$$+ A_2 \cdot (B_3 \cdot X^5 + B_2 \cdot X^4 + B_1 \cdot X^3 + B_0 \cdot X^2) \quad (7)$$

$$+ A_1 \cdot (B_3 \cdot X^4 + B_2 \cdot X^3 + B_1 \cdot X^2 + B_0 \cdot X) \quad (8)$$

$$+ A_0 \cdot (B_3 \cdot X^3 + B_2 \cdot X^2 + B_1 \cdot X + B_0) \quad (9)$$

$$= C_6 \cdot X^6 + C_5 \cdot X^5 + C_4 \cdot X^4 + C_3 \cdot X^3 + \quad (10)$$

$$C_2 \cdot X^2 + C_1 \cdot X + C_0$$

Figure 7:
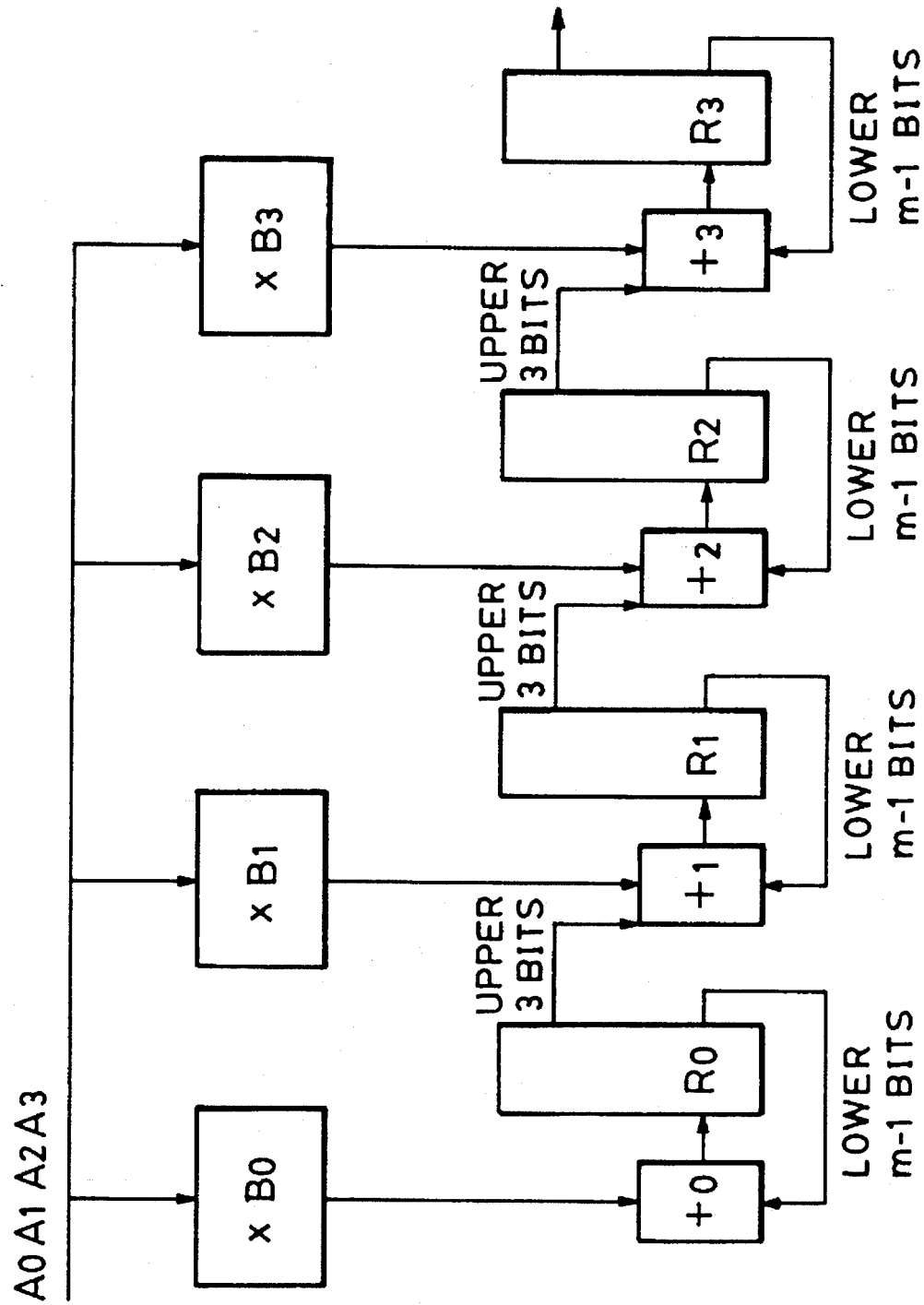

As shown in FIG. 7, the multiplier circuit arranged to execute this operation is formed of four multipliers ($\times B_0$ to $\times B_3$) for executing multiplication a·b=c of m×m bits, four 2m-bit full adders with a carry ($+_1$ to $+_4$), and four (2m+1)-bit registers ($R_0$ to $R_3$).

In the initial state, the content of each register in the circuit shown in FIG. 7 is "0".

When $A_3$ is input by a first clock pulse, the coefficients $A_3 \cdot B_i$ (i=3, ..., 0) of the sub-terms in the term (6) are output from the multipliers and stored in the the registers ($R_0$ to $R_3$) through the full adders ($+_0$ to $+_3$).

When $A_2$ is input by the next clock pulse, the coefficient $C_6$ (=$A_3 \cdot B_3$) of $X_6$ designating the uppermost place of A·B is output from the right-end register $R_3$ through the full adder $+_4$. Simultaneously, in each of the other full adders ($+_0$ to $+_3$), the sum of the output $A_3 \cdot B_{i-1}$ (i=3 ... 0) from the adjacent register on the left-hand side and the output $A_2 \cdot B_i$ (i=3, ..., 0) from the multiplier, i.e., ($A_3 \cdot B_{i-1} + A_2 \cdot B_i$) (i=3, ..., 0) is calculated. The output from the full adder is input to the adjacent register on the right side. This means the calculation of the sum of the coefficients of $X^5$, $X^4$, and $X^3$ in the terms (6) and (7) of the above equation.

$B_i$ (i=-1, ..., -n) is assumed to be always "0". The output from each full adder has 2m+1 bits if there is a carry, since each of $A_3 \cdot B_{i-1}$ and $A_2 \cdot B_i$ represents a 2m-bit value. Each register therefore requires 2m+1 bits. Each bit in each register designates a place, and the most significant bit in one register corresponds to $2^{2m}=X^2$th place from the least significant bit. However, since each register $R_i$ stores operation result with respect to the X places, the most significant bit in each register $R_i$ has the same place as the least significant bit in the next but one register $R_{i+2}$ on the right side.

When $A_1$ is input by the next clock pulse, $C_5$ (=$A_3 \cdot B_2 + A_2 \cdot B_3$) corresponding to the coefficient of $X^5$ is output from the full adder ($+_4$) at the right end as viewed in FIG. 7. At this time, the most significant bit in the second-nearest register $R_2$ on the left side, having the same place as the least significant bit of $C_5$, and the most significant bit in the adjacent register $R_3$ on the left side, having the same place as the place X of $C_5$, are also added and output. At this time, in each of the other full adders ($+_1$ to $+_3$), the most significant bit in the third-nearest register on the left side, i.e., a carry output from the same, is added as a carry along with the 2m-bit output from the adjacent register on the left side and the 2m-bit output from the multiplier, and a (2m+1)-bit output is thereby formed. Thus, the coefficients of the sub-terms in the terms (6) to (8) are added.

Similarly, when final input $A_0$ is input by the next clock pulse, $C_4$, which is the coefficient of $X_4$, is output from the right-end full adder ($+_4$), and the multipliers output the coefficients $A_0 \cdot B_i$ (i=3 ... 0) of the sub-terms in the term (9). By receiving these outputs, the full adders successively output coefficients $C_3$ to $C_0$ with respect to $X^3$ to $X^0$, thereby entirely outputting the multiplication result. Thus, the operation A·B is performed efficiently as partitioned values of A are successively input.

It has been explained that a multiplier circuit of n·m bits can be realized efficiently by using multipliers of m×m bits in a case where an input value is supplied by being partitioned into n values with respect to m bits. It is apparent that a multiplication can also be executed with the same circuit even when h≠n. It is also apparent that a multiplier circuit for achieving the same effect can also be formed by removing the full adder and the register at the right end or by further annexing a full adder and a register. The arrangement of the same processing elements as shown in FIG. 7 is also advantageous in that a large-scale circuit such as a VLSI can be easily realized thereby.

The same effect can also be achieved by providing a full adder ($+_0$) between the multiplier ($\times B_0$) and the register $R_0$ in the circuit shown in FIG. 7. The operation in accordance with this embodiment can also be practiced by using a pipe line system designed by considering a groups of a multiplier ($\times B_i$), a full adder ($+_i$) and a register ($R_i$) as one processing element (PE). Also, it may be practiced by using a multiplier ($\times B_i$), a full adder ($+_i$)a and a memory having a plurality of areas and by performing programmed sequential or parallel processing.

[Embodiment 5]

A multiplier circuit arranged to partition a 2m-bit output into upper m bits and lower m bits for the purpose of reducing the necessary register size so that the circuit scale is smaller will be described below.

From the equation (10), $$A \cdot B = C_7' X^7 + C_6' X^6 + C_5' X^5 + C_4' X^4 + C_3' X^3 + C_2' X^2 + C_1' X + C_0' \quad (11)$$

$$C_i' = \text{up}(C_{i-1}) + \text{down}(C_i) \quad (12)$$

Figure 8:
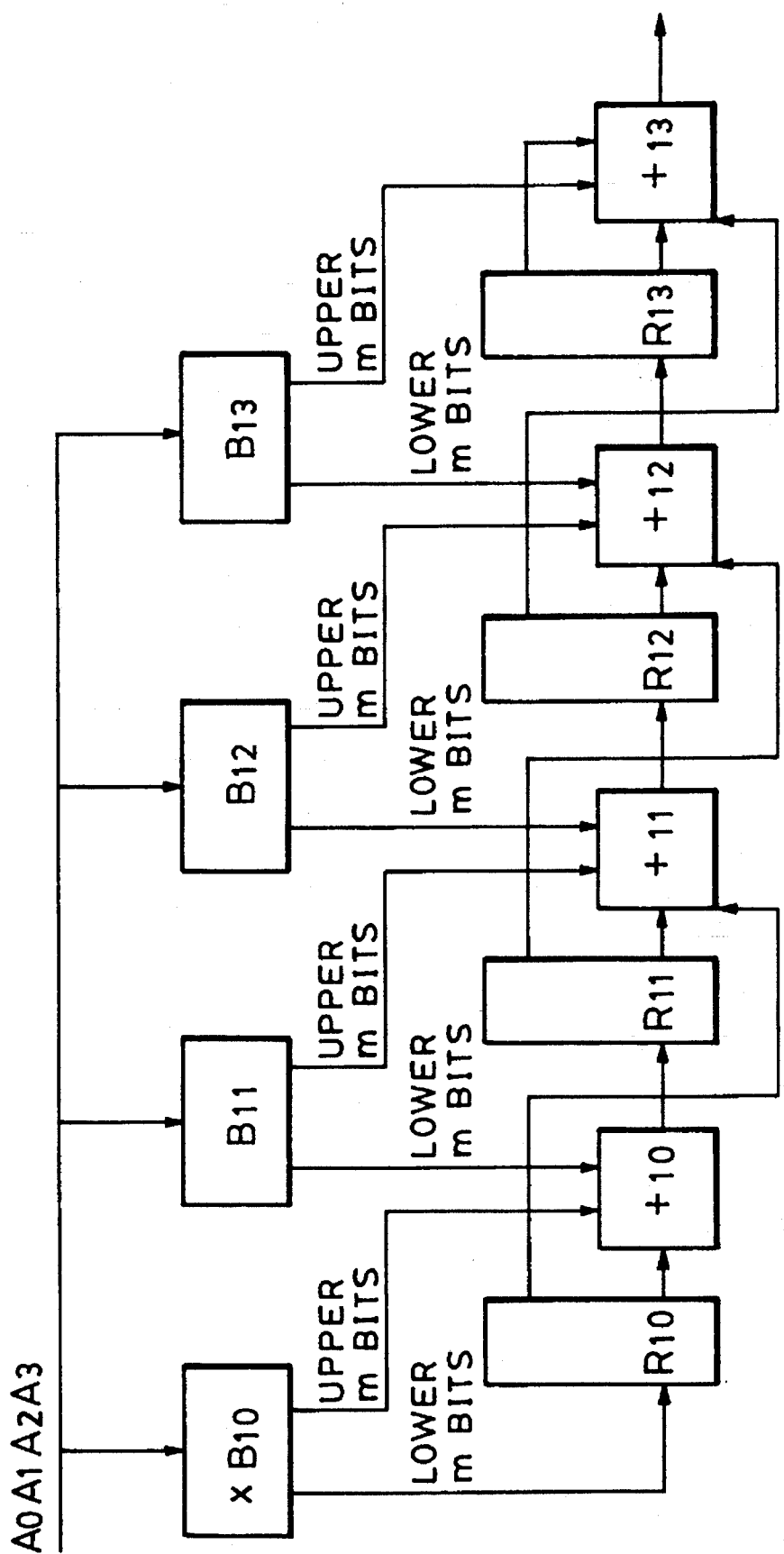

As shown in FIG. 8, the multiplier circuit arranged for this operation is formed of four multipliers ($\times B_{10}$ to $\times B_{13}$) for executing multiplication a·b=c of m×m bits, four 3-input m-bit full adders with a carry ($+_{10}$ to $+_{13}$), and four (m+1)-bit registers ($R_{10}$ to $R_{13}$).

When $A_3$ is input by a first clock pulse, the coefficient $A_3 \cdot B_i$ (i=3, ..., 0) of each of the sub-terms in the term (6) is output from the corresponding multiplier. Since $A_3 \cdot B_i$ output from the multipliers is an 2m-bit output (corresponding to $2^{2m}=X^2$ places), the lower m bits of the right multiplier ($B_{1i}$) and the upper m bits of the left multiplier ($B_{lib-1}$) have the same places. In each full adder ($+_{1i-1}$) shown in FIG. 8, therefore, the upper m bits and the lower m bits of the left and right multipliers are simultaneously added to each other, the addition result is input to the register ($R_{lib}$), and the operation result with respect to X places is stored.

The upper m bits and the lower m bits are expressed as up($C_{i-1}$) and down($C_i$), as in the equation (12). Accordingly, the coefficient $C_7'$ of $X^7$ designating the uppermost place of A·B shown in the equation (11) is output through the right-end full adder ($+_{13}$). At this time, if there is a carry from the sum of the upper and lower m bits, the (m+1)th bit in the corresponding register is stored as a carry bit. The (m+1)th bit representing a carry has the same place as the least significant bit in the adjacent register on the right side.

When $A_2$ is input by the next clock pulse, the upper m bits of $A_2 \cdot B_3$ output from the right-end multiplier and the output from the register $R_{13}$ on the left side are added in the full adder ($+_{13}$) at the right end as viewed in FIG. 8, and the coefficient $C_6'$ of $X^6$ in the equation (11) is output. Simultaneously, in each of the full adders ($+_{10}$ to $+_{12}$), the sum of the upper/lower m bit outputs from the left and right multipliers and the lower m bit output from the adjacent register on the left side of the full adder is calculated and the output is input to the adjacent register on the right side.

Further, the (m+1)th bit in the second-nearest register on the left side is added as a carry to the full adder. The sums of the coefficients of the sub-terms in the terms (6) and (7) are thus calculated. Since the output from each of the registers and the multipliers has m bits, a two-place carry may occur, and the number of bits of each register for storing the output from the corresponding full adder must be m+2.

When $A_1$ is input by the next clock pulse, the coefficient $C_5'$ of $X^5$ is output from the right-end full adder ($+_{13}$). At this time, to each full adder, the upper two bit in the second-nearest register on the left side having the same place as the lower two bits of the adjacent register on the left side are input as a carry. The full adder executes addition and output m+2 bits.

When final input $A_0$ is input by the next clock pulse, the coefficient $C_4'$ of $X^4$ is output from the right-end full adder ($+_{13}$). In the other full adders, the coefficients $C_3'$ to $C_0'$ are calculated with respect to $X^3$ to $X^0$. The calculated values are stored in the registers.

Thereafter, the same operational steps are repeated while "0" is input by 4 clock pulses. The values $C_3'$ to $C_0'$ in the registers are thereby output successively from the right-end full adder ($+_{13}$) until the multiplication result is entirely output. Thus, the operation A·B is performed efficiently as partitioned values of A are input.

[Embodiment 6]

Figure 9:
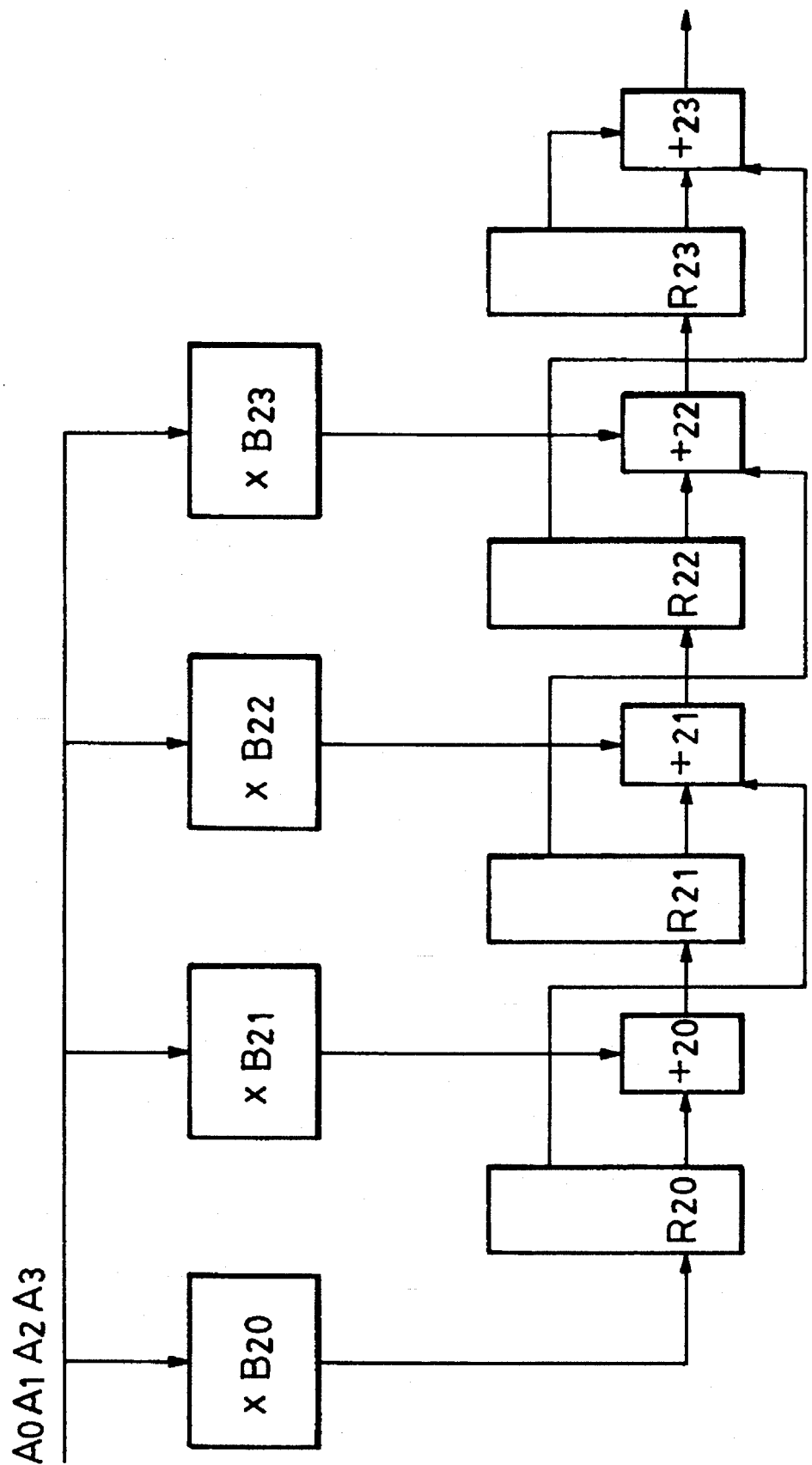

A multiplier circuit is formed as shown in FIG. 9. The arrangement shown in FIG. 1 corresponds to a case where each of $A_i$ and Bi (i=n−1, . . . , 0) represents 1-bit units. The multiplier circuit shown in FIG. 9 is formed of four (1×1)-bit multipliers (×$B_{20}$ to ×$B_{23}$), four 1-bit full adders with a carry ($+_{20}$ to $+_{23}$), and four 2-bit registers ($R_{20}$ to $R_{23}$). In the initial state, the content of each register in the circuit shown in FIG. 9 is "0".

When $A_3$ is input by a first clock pulse, the coefficient $A_3 \cdot B_i$ (i=3, . . . , 0) of each of the sub-terms in the term (6) is output from the corresponding multiplier and is stored in the register through the full adder.

When $A_2$ is input by the next clock pulse, the coefficient $C_6$ (=$A_3 \cdot B_3$) of $X^6$ representing the uppermost place of A·B is output from the right-end register $R_{23}$ through the full adder ($+_{23}$). Simultaneously, in each of the other full adders ($+_{20}$ to $+_{22}$), the sum of the output $A_3 \cdot B_{i-1}$ (i=3, . . . , 0) from the adjacent register on the left-hand side and the output $A_2 \cdot B_i$ (i=3, . . . , 0) from the multiplier, i.e., ($A_3 \cdot B_{i-1} + A_2 \cdot B_i$) (i=3, . . . , 0) is calculated. The output from the full adder is input to the adjacent register on the right side.

This means the calculation of the sum of the coefficients the sub-terms in the terms (6) and (7). $B_i$ (i=−1, . . . , −n) is assumed to be always "0". The output from each full adder has a 2-bit form if there is a carry, since each of $A_3 \cdot B_{i-1}$ and $A_2 \cdot B_i$ is 1 bit. Each register therefore requires 2 bits. Each bit in each register designates a place, and the upper bit in each register has the same bit as the lower bit in the adjacent register on the right side.

When $A_1$ is input by the next clock pulse, $C_5$ (=$A_3 \cdot B_2 + A_2 \cdot B_3$) corresponding to the coefficient of $X^5$ is output from the right-end full adder ($+_4$) in the circuit shown in FIG. 9. At this time, the most significant bit in the second-nearest register $R_{22}$ on the left side, having the same place as the least significant bit of $C_5$ is also added and output. At this time, in each of the other full adders, the most significant bit in the third-nearest register on the left side, i.e., a carry output from the same, is added as a carry along with the 1-bit output from the adjacent register on the left side and the 1-bit output from the multiplier, and a 2-bit output is thereby formed. Thus, the coefficients of the sub-terms in the terms (6) to (8) are added.

When final input $A_0$ is input by the next clock pulse, C4, which is the coefficient of $X_4$, is output from the right-end full adder ($+_{23}$), and the multipliers output the coefficients $A_0 \cdot B_i$ (i=3, . . . , 0) of the sub-terms in the term (9). By receiving these outputs, the full adders ($+_{23}$ to $+_{20}$) successively output coefficients $C_3$ to $C_0$ with respect to $X^3$ to $X^0$. The coefficients are stored in the registers.

Thereafter, the same operational steps are repeated while "0" is input by 4 clock pulses. The values $C_3$ to $C_0$ in the registers are thereby output successively from the right-end full adder ($+_{23}$) until the multiplication result is entirely output. Thus, the operation A·B is performed efficiently as partitioned values of A are successively input.

It has been explained that a multiplier circuit of n·m bits can be realized efficiently by using multipliers of m×m bits in a case where an input value is supplied by being partitioned into n values with respect to m bits. It is apparent that a multiplication can also be executed with the same circuit even when h≠n.

It is also apparent that the 3-input m-bit full adder having a carry can be realized by a combination of a plurality of 2-input full adders and half adders. Further, it is apparent that a multiplier circuit for achieving the same effect can also be formed by removing the full adder and the register at the right end or by further annexing a full adder and a register in the circuit shown in FIG. 8 or 9. Since the circuit shown in FIG. 9 is arranged for 1×1 multiplication, it is free from reduplication of places from the multiplier outputs and may have a simpler circuit configuration in comparison with the circuit shown in FIG. 8. The arrangement of the same processing elements as shown in FIG. 8 or 9 is also advantageous in that a large-scale circuit such as a VLSI can be easily realized thereby.

[Embodiment 7]

Figure 2:
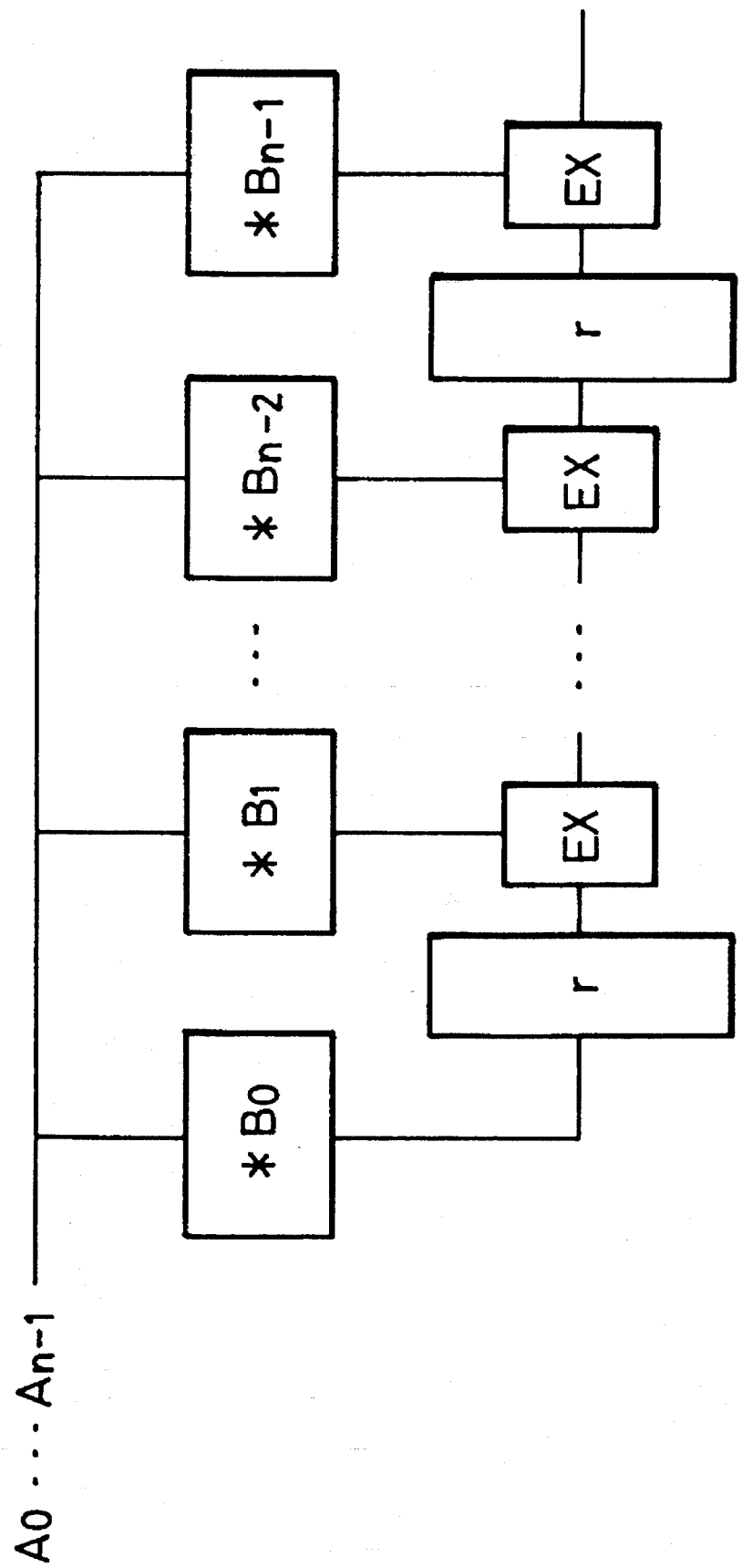
FIG. 2 is a diagram of an example of a conventional multiplier circuit on a Galois field.

If the multiplier circuit shown in FIG. 2 is used for an integer operation, carries i from lower places cannot be taken into account because the operation is performed from an upper place. Further, at least n clock pulses are required to successively input and calculate Ai (i=n−1, . . . , 0). Therefore, a system for speeding the processing may be arranged in which inputting is effected from a lower place and a plurality of Ai values are input simultaneously. A multiplier circuit for performing a multiplication with n/2 clock pulses will be described below as an example.

Figure 10:
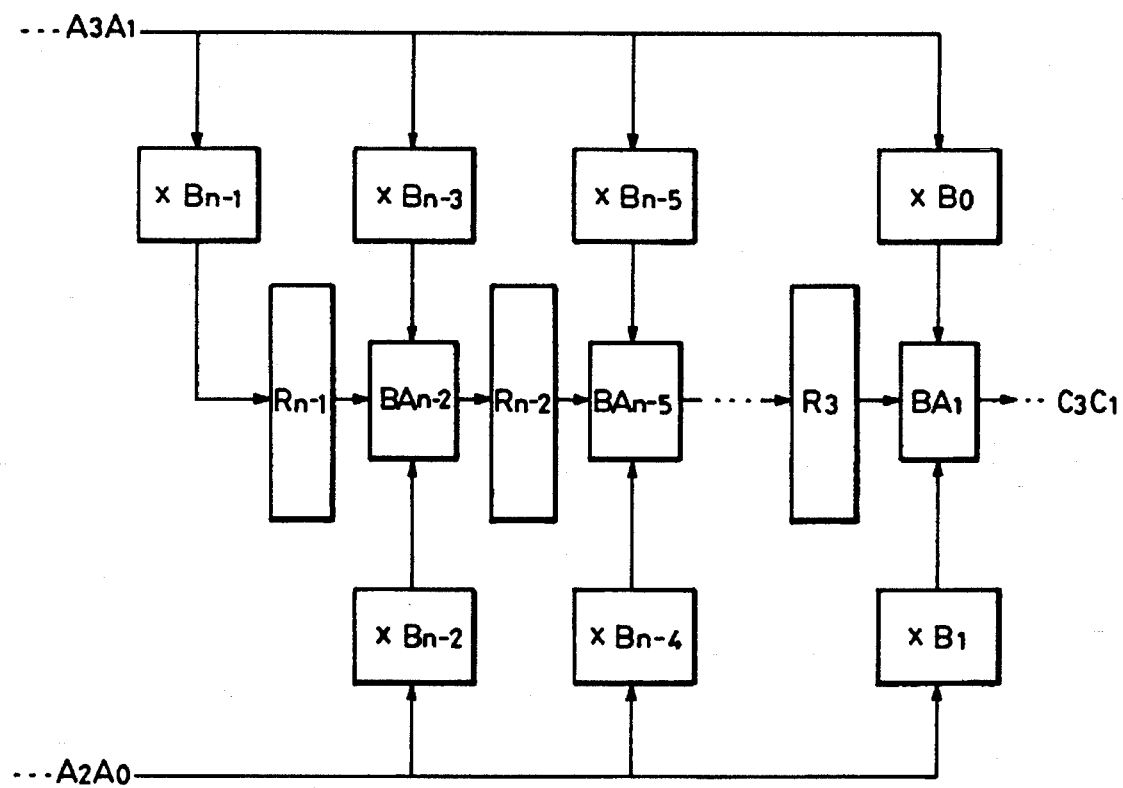
Figure 10:
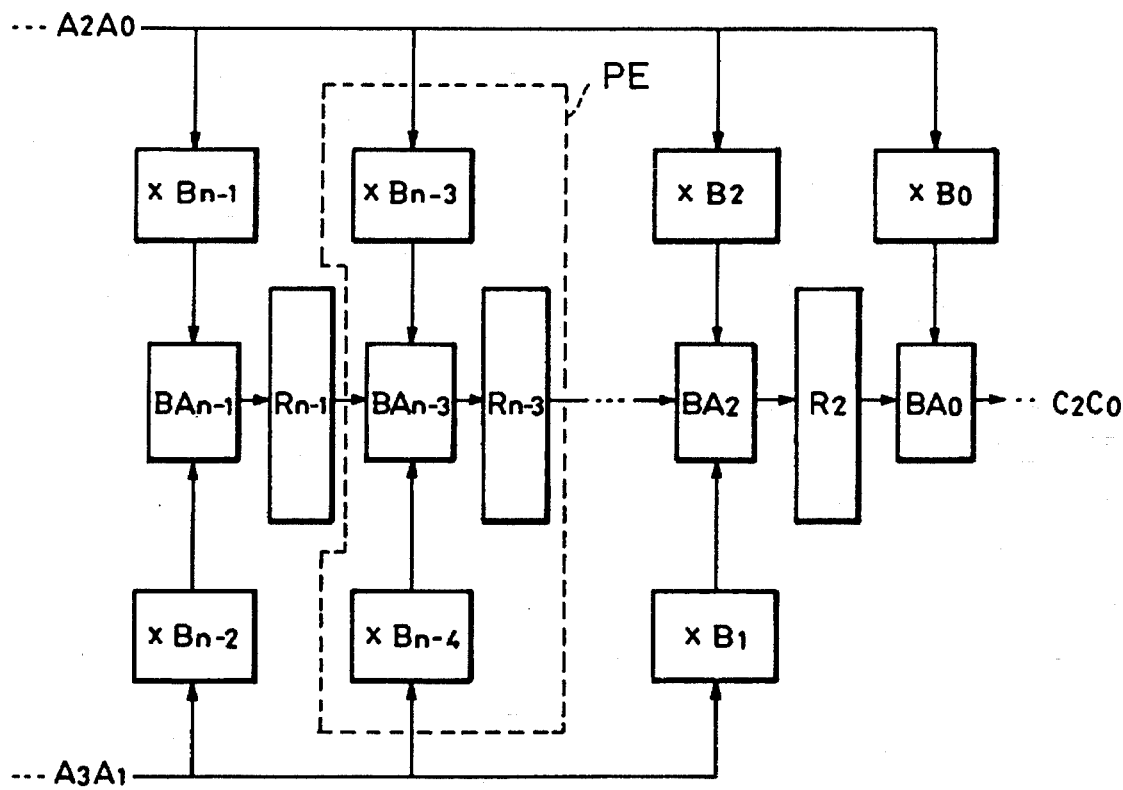

Such a multiplier circuit may be formed as shown in FIG. 10. The multiplier circuit shown in FIG. 10 is formed of a pair of circuits illustrated in upper and lower sections of FIG. 10. The upper circuit serves to obtain Ck (k=0, 2, . . . , n−2) while the lower circuit serves to obtain $C_k$ (k=1, 3, .

..., n−1). These circuits are formed of 2n multipliers ($\times B_0$ to $\times B_{n-1}$) for executing multiplication a·b=c of m bits with multiplication factors $B_j$ (j=0, ..., n−1), n 3-input 2m-bit full adders ($BA_0$ to $BA_{n-1}$) with a buffer for delaying a carry two clock cycles, and n−1 2m-bit registers ($R_2$ to $R_{n-1}$).

In the circuit shown in the lower section of FIG. 10, $A_0$ and $A_1$ are input through an upper line and a lower line, respectively, by a first clock pulse. Then, $C_0$ (=$A_0 \cdot B_0$) corresponding to the lowermost place is output from the right-end buffered adder $BA_0$, and $A_0 \cdot B_j + A_1 \cdot B_{j-1}$ (j=2, 4, ..., n−1) is stored in each register. The content of each register in the initial state is "0".

When $A_2$ and $A_3$ are input by the next clock pulse, the sum of the output ($A_0 \cdot B_2 + A_1 \cdot B_1$) from the right-end register $R_2$ and the output $A_2 \cdot B_0$ from the multiplier ($\times B_0$), i.e., $C_2$ (=$A_0 \cdot B_2 + A_1 \cdot B_1 + A_2 \cdot B_0$) is output from the buffered adder $BA_0$. This output value corresponds to the coefficient of $X^2$ in the equation (5). A carry of ($A_0 \cdot B_2 + A_1 \cdot B_1$) is stored in the buffer of the buffered adder $BA_0$ and is used as a carry in the addition effected by the next clock pulse. In the register and the buffer at each stage, a value which is the sum of the output from the register at the preceding stage and the output from the two multipliers is stored.

It can be understood that if the above-described operational steps are repeated by n/2 clock pulses until $A_{n-2}$, $A_{n-1}$ are input, the even-number terms of the equation (5) operation result are calculated. Thereafter, the same operational steps may be repeated while "0" is input so that the operation result is entirely output. The contents of the registers may be collectively shifted into other registers. Accordingly, it is considered that the number of processing clock pulses is substantially n/2.

Similarly, in the circuit shown in the upper section of FIG. 10, $A_1$ and $A_0$ are input through an upper line and a lower line, respectively, by the first clock pulse. Then, $C_1$ (=$A_0 \cdot B_1 + A_1 \cdot B_0$) which is the coefficient of the Xth place of the equation (5) is output from the buffered adder $BA_1$, and $A_0 \cdot B_j + A_1 \cdot B_{j-1}$ (j=3, 5, ..., n−2) is stored in each register.

When $A_3$ and $A_2$ are input by the next clock pulse, the sum of the output ($A_0 \cdot B_3 + A_1 \cdot B_2$) from the right-end register $R_3$ and the output from the multiplier ($\times B_0$, $XB_1$), i.e., $C_3$ (=$A_0 \cdot B_3 + A_1 \cdot B_2 + A_2 \cdot B_1 + A_3 \cdot B_0$) is output from the buffered adder $BA_1$. This output value corresponds to the coefficient of $X^3$ in the equation (5). At this time, a carry is stored in the buffer of the buffered adder BA and is used as a carry in the addition effected by the next clock pulse, as in the case of the lower circuit.

It can be understood that the equation (5) operation result is obtained in such a manner that two lower-place values are simultaneously calculated and output at a time. Accordingly, the number of processing clock pulses necessary for the multiplication of the equation (5) is substantially n/2.

Figure 11:
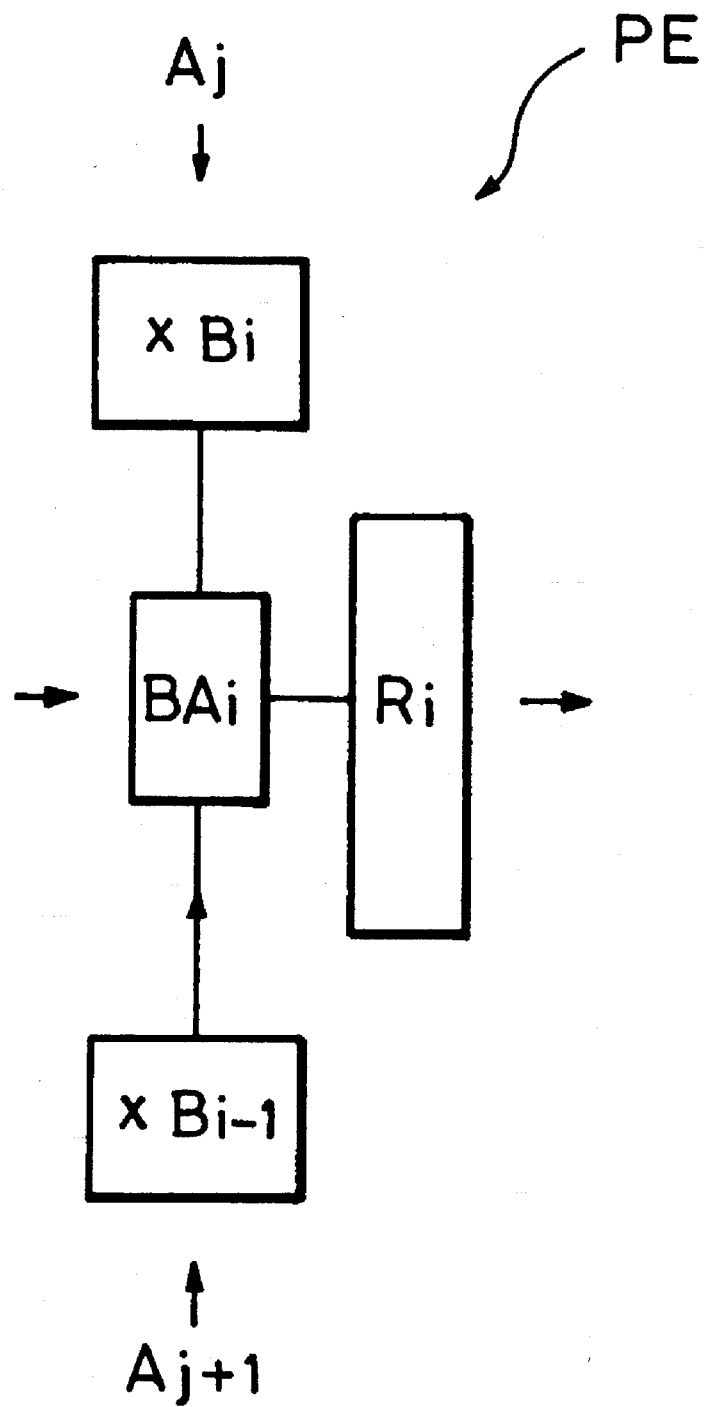

Thus, the operation A·B is performed efficiently as partitioned values of A are successively input. The circuit shown in FIG. 10 can be formed by arranging the same processing elements each formed as shown in FIG. 11 and is advantageous in that a large-scale circuit such as a VLSI can be easily realized thereby.

Figure 12:
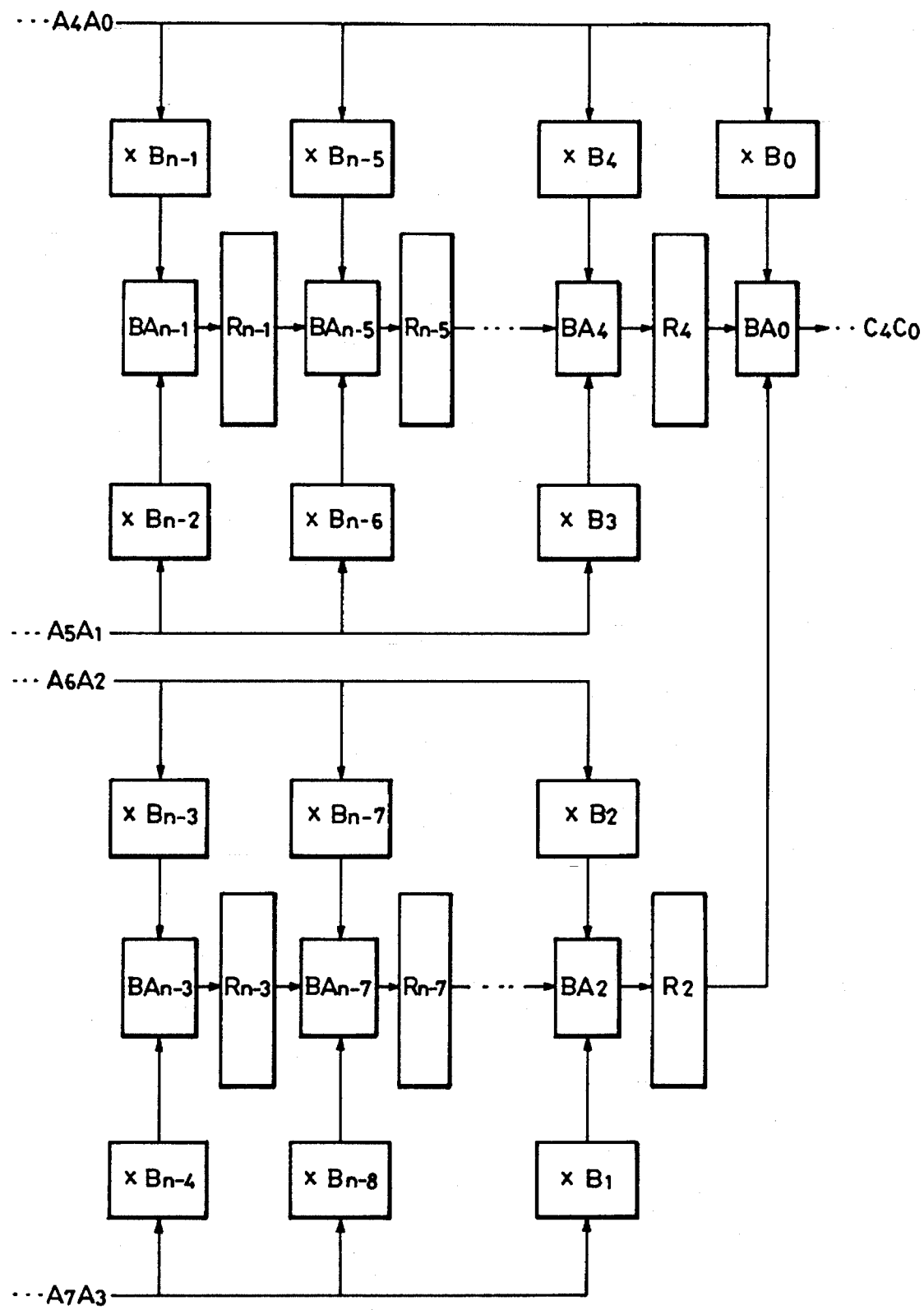

It has been explained that a multiplier circuit of n·m bits can be realized efficiently by using multipliers of m×m bits in a case where an input value is supplied by being partitioned into n values with respect to m bits. It is apparent that a multiplication can also be executed with the same circuit even when h∫n. In the illustrated embodiment, a multiplication is executed on the basis of n/2 clock pulses by a pair of circuits. However, it is apparent that a multiplication can be executed on the basis of n/p clock pulses by a set of p circuits in which p signals of $A_i$ are simultaneously input to multiplier devices having a series of multiplier factors $B_{j+k}$ (j=0, p−1, ... ) with k shifted with respect to the input signals. Accordingly, a multiplier circuit whose operating speed can be increased as desired by the selection of p can be formed. FIG. 12 shows an example of a circuit in such a multiplier with respect to P=4, which outputs $C_0$, $C_4$, $C_8$, .... If the circuit shown in FIG. 12 can be simplified if each of adders BA is a 5-input full adder.

In a case where p=2 as in this embodiment, a circuit portion for making a carry with each full adder is closed by a feedback using a buffer, and the problem of a delay relating to a carry, encountered in multiplication of integers, can therefore be avoided.

It is also apparent that the output from the circuit shown in FIG. 10, which represents a 2m-bit unit, can be formed as an m-bit output by using such a buffered full adder. That is, the arrangement may be such that upper m bits in a series of 2m bits are input to an m-bit register, an output from the register is input to an m-bit full adder, lower m bits are directly input to the full adder, and a carry is fed back to the full adder with a 1-bit delay.

This circuit configuration can also be used as a high-speed multiplier circuit in a calculation system such as a Galois field using no carry. In such a case, adders may be EXOR circuits.

[Embodiment 8 ]

A multiplier circuit for performing repeated operations as parallel processing on the basis of a pipe line processing will be described below.

Figure 13:
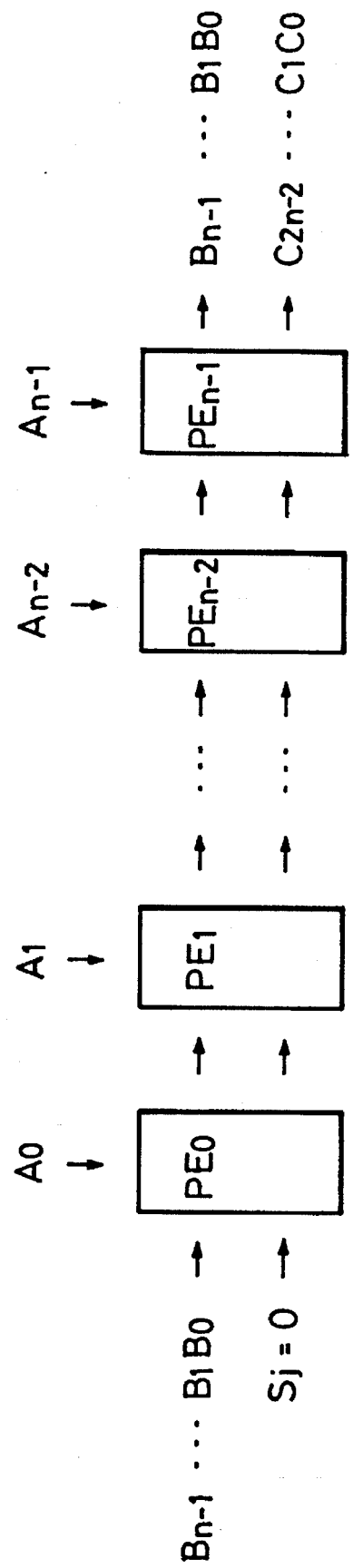

The multiplier circuit is formed as shown in FIG. 13 and has an overall configuration called a systolic array. In a systolic array, an operation is executed by a pipe line processing using small blocks having the same functions and each called a processing element (PE).

Figure 14:
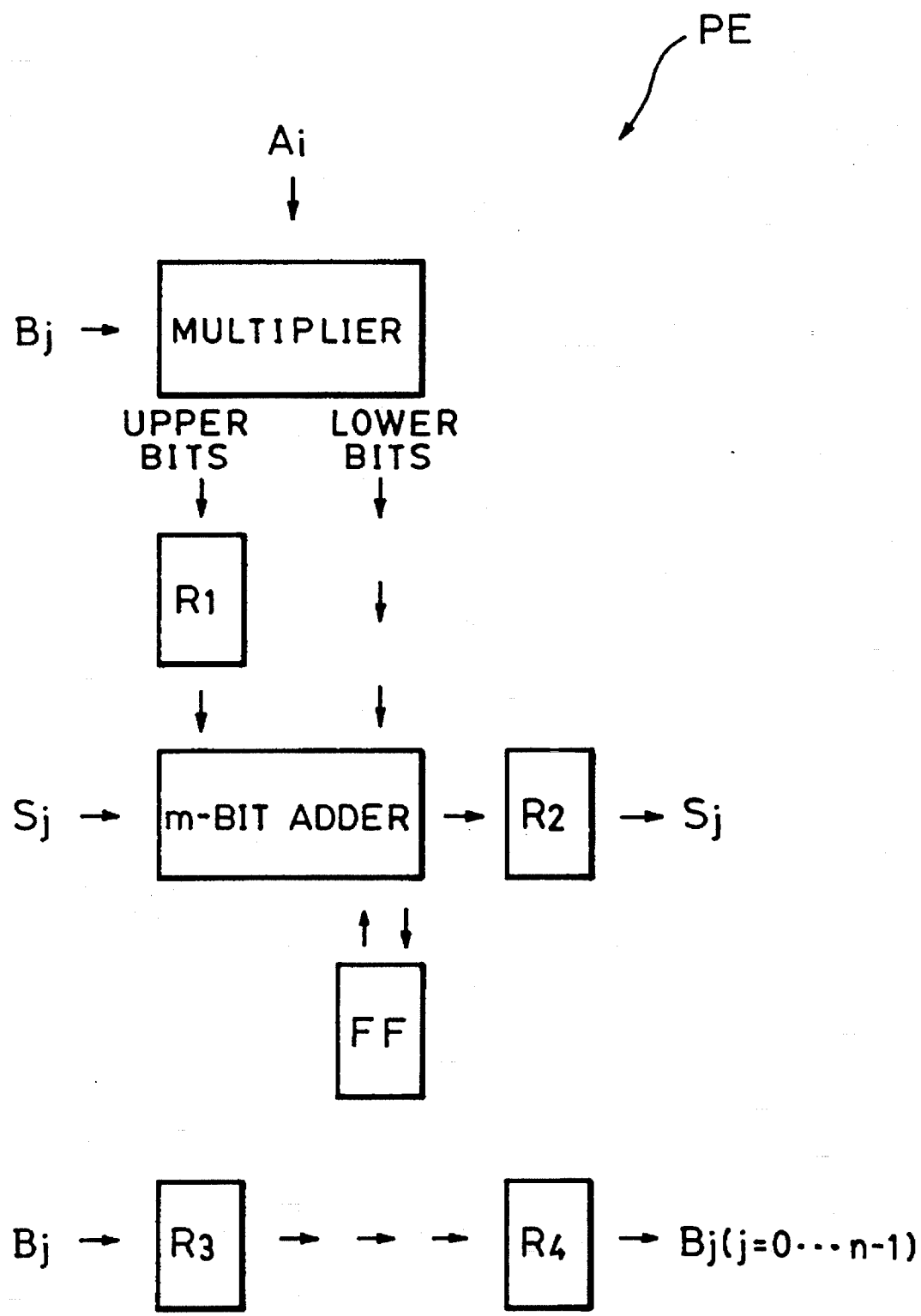

As shown in FIG. 14, each PE is formed of a multiplier for executing a multiplication a·b=c of m bits ($A_j \times B_j$ in this embodiment), m-bit registers ($R_1$ to $R_4$), a 3-input m-bit adder, and a flip flop FF which latches a carry output from the adder and which returns the carry output as a carry input to the adder with a delay corresponding to one clock cycle. $A_i$ (i=0, ..., n−1) is the above-described partitioned values of integer A and is previously set in each PE as shown in FIG. 13.

Referring to FIG. 13, $B_j$ is input in the order of $B_0$, $B_1$ ... $B_{n-1}$, and a preceding stage input $S_j$ to $PE_0$ is always "0".

In the first processing element $PE_0$ (when $A_i$ is $A_0$), 2m-bit outputs $A_0 \cdot B_0$, $A_0 \cdot B_1$ ..., $A_0 \cdot B_{n-1}$ are output from the multiplier. Lower m bits of each output from the multiplier is directly input to the adder, but upper m bits are input to the adder after being delayed one clock cycle by the register $R_1$. This is because, since each output from the multiplier has a 2m-bit form such that the outputs from the multiplier overlap every m bits with respect to the m-bit division designated by X in the term (1), the output is to be sent in the same m-bit form as the input.

Since this addition is performed from a lower place to an upper place, an output carry is delayed one clock cycle by the flip flop to be used as a carry at the time of the upper place operation performed in the next clock cycle. The result of the operation $S_j \leftarrow A_0 \cdot B_j$ is thereby output from the first processing element $PE_0$.

The same operation is performed in the second processing element $PE_1$ in the circuit shown in FIG. 13 (when $A_i = A_1$). However, operation $A_1 \cdot B_j$ (j=0, ..., n−1) is treated as operation $A_1 \cdot B_j \cdot X$ one place above $S_j$, because $B_j$ is input after being delayed one clock cycle by the two registers $R_3$ and $R_4$. Accordingly, the output from the adder is successively output as $S_j \leftarrow A_1 \cdot B_{j-1} + S_j$.

It can be understood that the output from the systolic array $PE_{n-1}$ shown in FIG. 13 becomes $C_k$ ($k=0, \ldots, 2n-2$) representing every m bits from the lower place of A·B as the same processing is thereafter repeated to the final processing element $PE_{n-1}$ ($A_j = A_{n-1}$).

Figure 15:
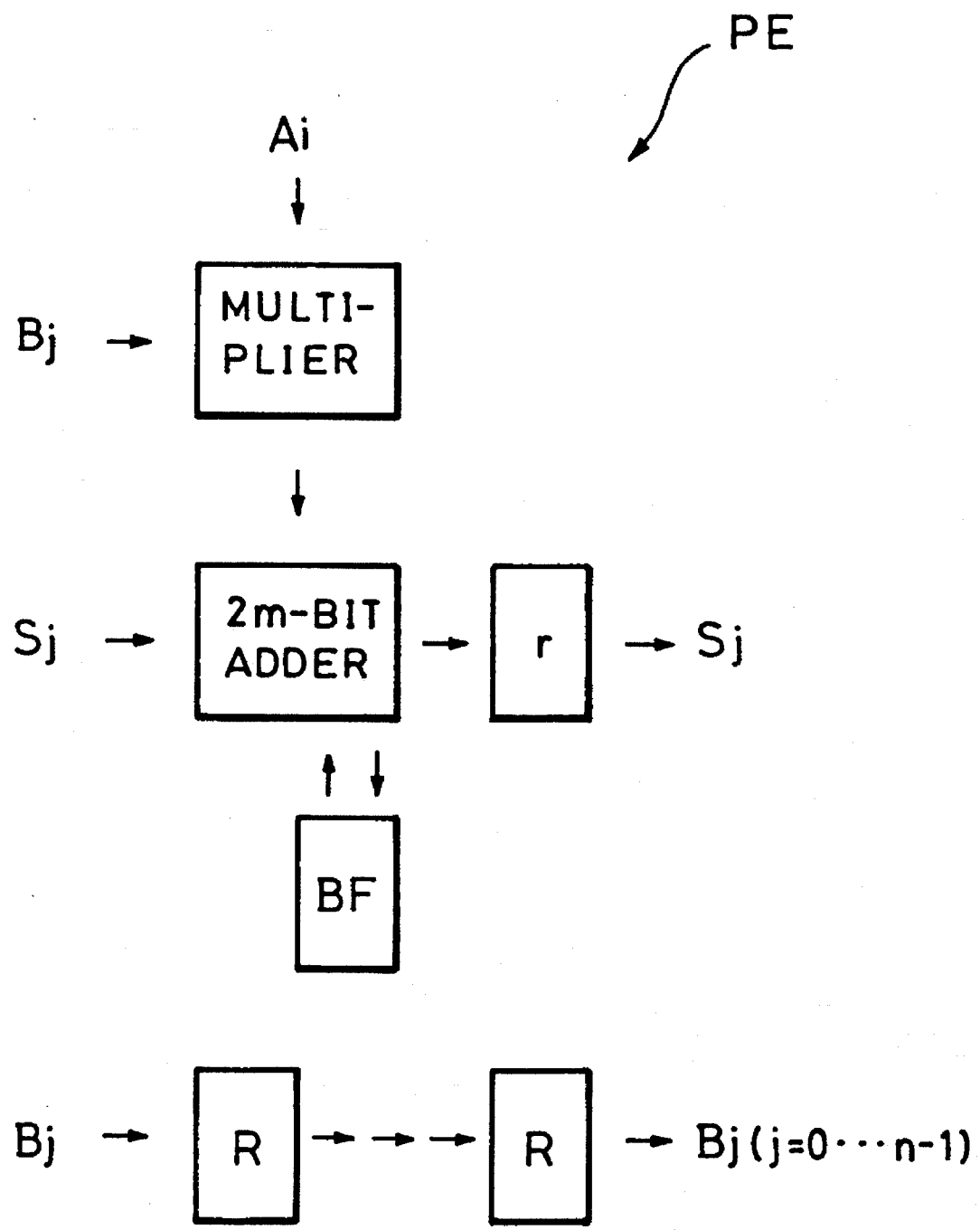

The same operation can also be performed in such a manner that, with respect to the internal construction of the PE, the 2m-bit output from the multiplier is directly input to the adder to output 2m-bit $S_j$, as shown in FIG. 15. A block r in FIG. 15 represents a 2m-bit register, and a block BF represents a 2-bit buffer for delaying a carry from the adder two clock cycles. These are required to supply the output from the multiplier not in the m-bit unit form but in a 2m-bit unit form, as mentioned above.

It has been explained that a multiplier circuit of n·m bits can be realized efficiently by using multipliers of m×m bits in a case where an input value is supplied by being partitioned into n values with respect to m bits. It is apparent that a multiplication can also be executed with the same circuit even when h≠n. Thus, the operation A·B is performed efficiently as partitioned values of integer A are successively input.

A systolic array can be formed of a regular arrangement of simple identical PEs and can easily be formed as a large scale circuit such as a VLSI. Also, a multiplier circuit using such a systolic array can be realized very easily, because the PEs can be controlled by the same control system and because data can be supplied in synchronization with each other by the same clock. If the number of figures of A or B is greatly increased, PEs may be annexed to perform the necessary operation. This type of multiplier circuit therefore has high extendability.

Also, in this system, a carry is calculated in one PE and no carry is output to other PEs, and the problem a delay relating to a carry, encountered in multiplication of integers, can therefore be avoided.

[Embodiment 9]

Figure 16:
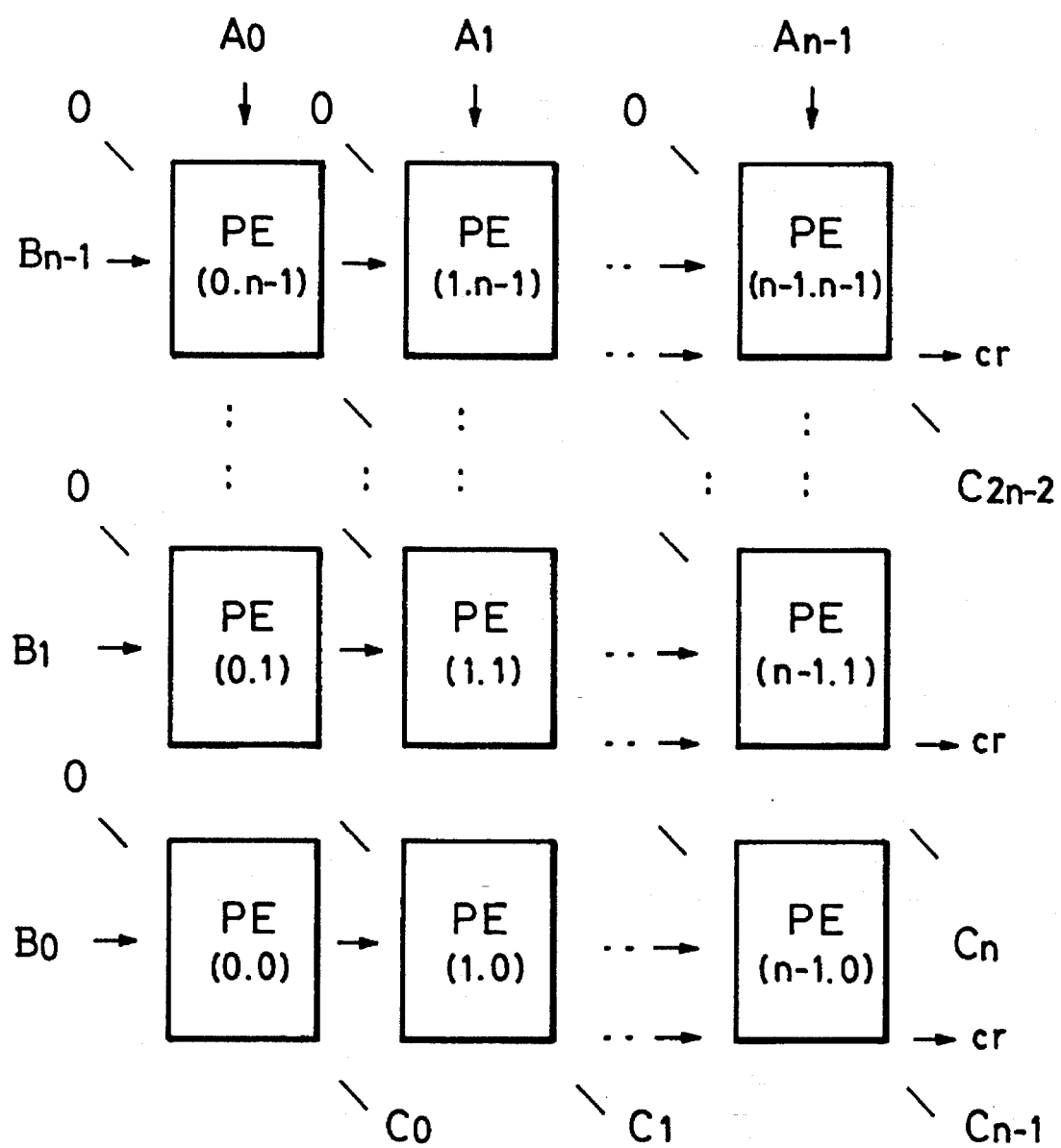
Figure 17:
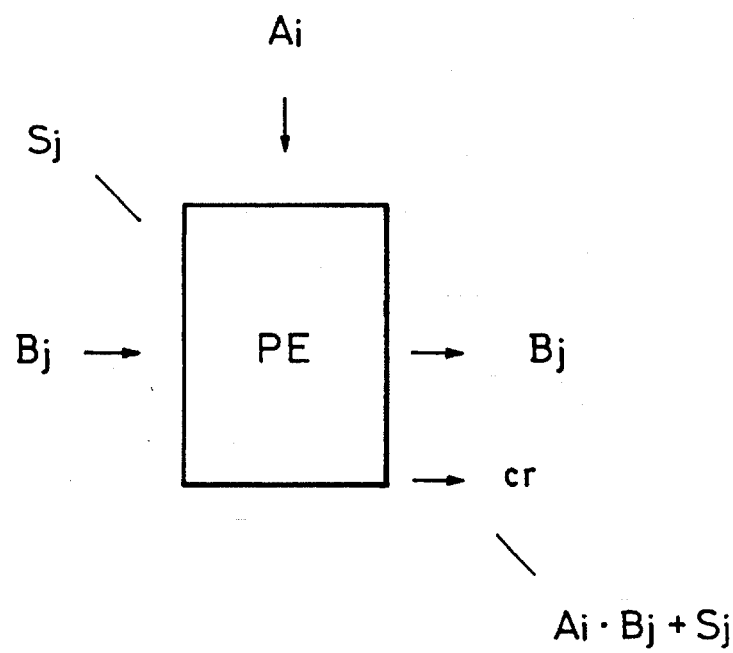

PEs in accordance with the above embodiment may be arranged two-dimensionally for further parallelized operation, and a multiplier circuit such as that shown in FIG. 16 may be formed. The operation of the circuit shown in FIG. 16 is also executed by a pipe line processing. The same values of $A_i$ ($i=0, \ldots, n-1$) are previously set in PE (i, 0) to PE (i, n-1) arranged in a vertical direction. In the arrangement shown in FIG. 16, each PE outputs $B_j$ ($j=0, \ldots, n-1$) to the PE on the right side with a delay corresponding to one clock cycle, as shown in FIG. 17. Then, $S_j$ is received from the PE located diagonally to the upper left, and $S_j \leftarrow A_i \cdot B_j + S_j$ is calculated. The calculation result $S_j$ is output to the PE located diagonally to the lower right, and a carry cr output by this calculation is output to the second-nearest PE on the right side. Data input/output at each PE varies depending upon the arrangement of PEs, but the functions of PE are equivalent.

Figure 18:
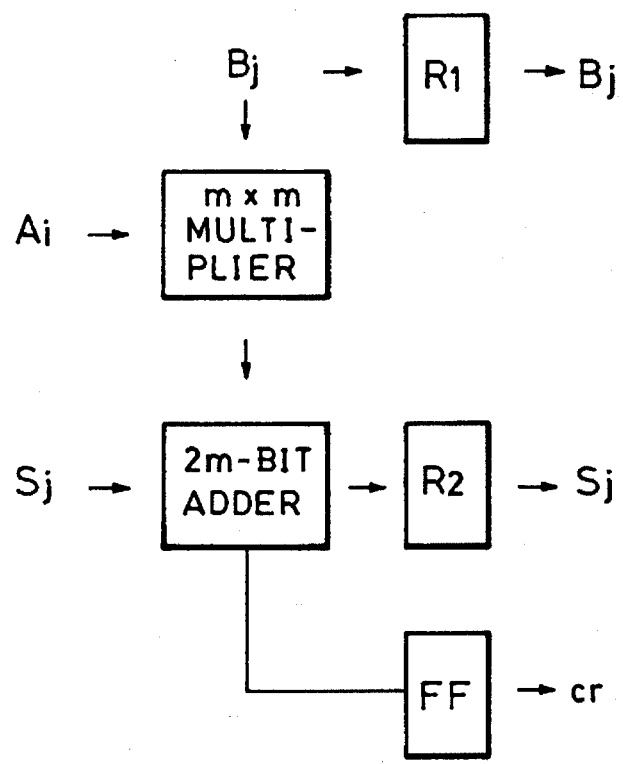
Figure 19:
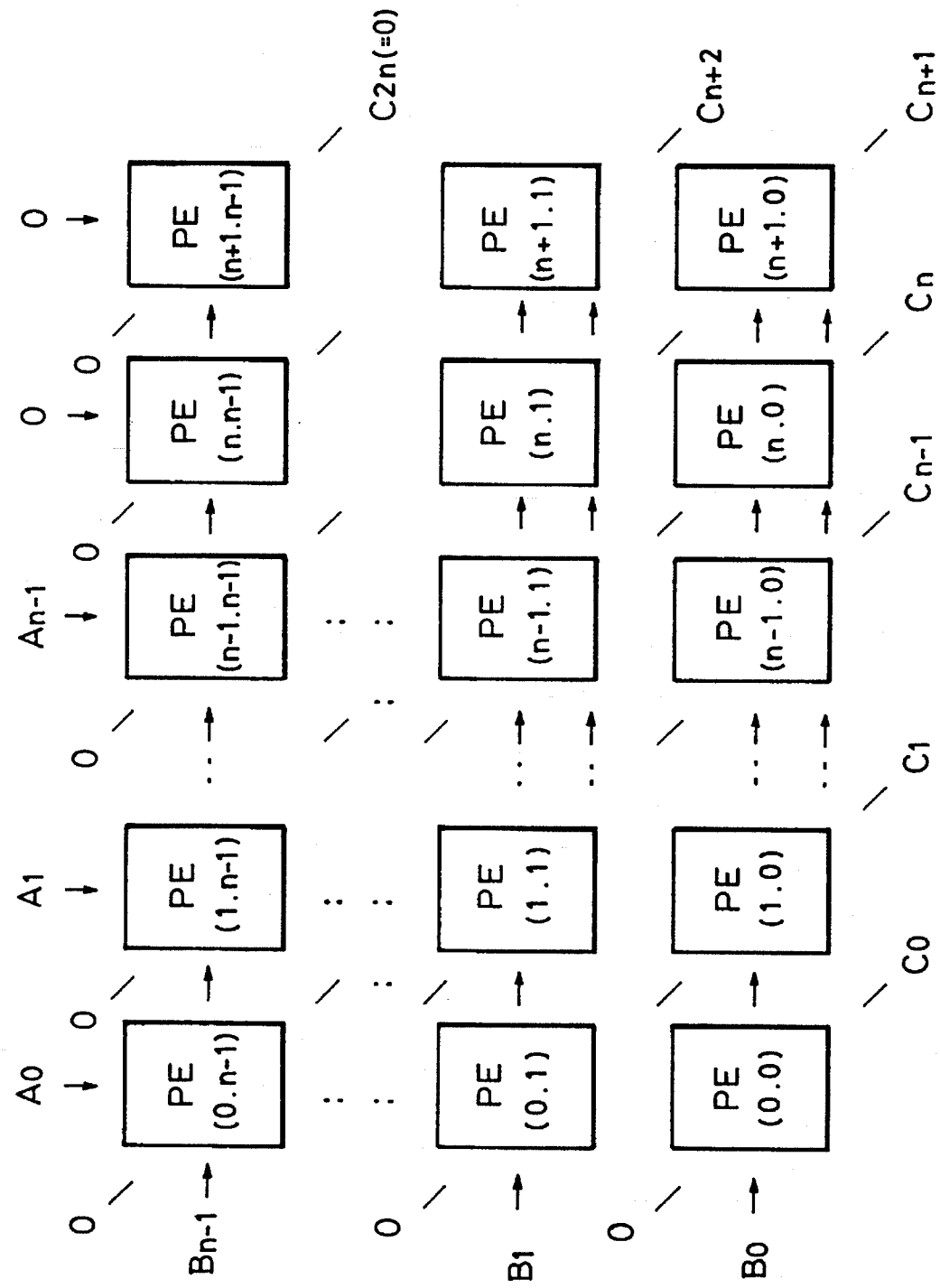

The PE shown in FIG. 17 is formed as shown in FIG. 18. That is, the PE is formed of a multiplier for executing a multiplication a·b=c of m bits ($A_i \times B_j$ in this embodiment), m-bit registers ($R_1$ to $R_4$), two 2m-bit registers $R_1$, and $R_2$, a 2-input m-bit adder, and a flip flop FF which latches carry cr from the adder.

Referring back to FIG. 16, values $B_0$ to $B_{n-1}$ are simultaneously output to corresponding ones of n PEs at the left end (in the left end column), i.e., PE (0, 0) to PE (0, n-1). "0" is input, as $S_j$ input, to each of the PEs in the left end column and the PEs in the upper end row from diagonally upper left positions.

In the n PEs in the left end column, i.e., PE (0, 0) to PE (0, n-1), $A_0 \cdot B_0, A_0 \cdot B_1, \ldots, A_0 \cdot B_{n-1}$ of 2m bits are calculated by the multipliers. The calculation results are output as $S_j = A_0 \cdot B_0$ to the PEs located diagonally to the lower right. In synchronization with this output, $B_j$ is output to the PEs on the right side. At this time, $C_0$ ($=A_0 \cdot B_0$) representing the lowermost place is output from the PE (0, 0) at the lower end of the left end column.

In the n PEs in the second column from the left end, i.e., PE (1, 0) to PE (1, n-1), $A_0 \cdot B_j + A_1 \cdot B_{j-1}$ is calculated from the output $S_j$ from the left end PEs one row above (diagonally to the upper left), and the calculation results are output newly as $S_j$ to the third row PEs one row below (diagonally to the lower right), while carry cr output from each adder is latched by the flip flop and is output to the fourth PE in the same row.

At this time, $C_1$ ($=A_0 \cdot B_1 + A_1 \cdot B_0$), i.e., the next-place output is output from the lower end PE (1, 0) in the second column. The multiplication result $A_i \cdot B_j$ in each PE is a 2m-bit value in contrast with m-bit $A_i$, $B_j$, and has places corresponding to $X^2$. However, since the place shift by the calculation effected in each PE is X, the carry is output as a carry signal the next but one PE.

It can be understood that, by repeating the same processing to the n PEs (n-1, 0) to PE (n-1, n-1) in the right end column, multiplication results, i.e., values of A·B in $X^{n-1}$ places are output from the lower end PEs (0, 0) to (n-1, 0) while multiplication results of A·B and carries above the $X^{n-1}$th place are output from the PEs (n-1, 0) to (n-1, n-1) in the right end column.

To obtain multiplication results including results of addition of carries, two columns of n PEs (n, 0) to in, n-1) and n PEs (n+1, 0) to (n+1, n-1) may be annexed or n adders for performing only carry addition operation may be annexed.

It has been explained that a multiplier circuit of n·m bits capable of operating at a high speed in a pipe line processing manner can be realized by using multipliers of m bits in a case where an input value is supplied by being partitioned into n values with respect to m bits. It is apparent that a multiplication can also be executed with the same circuit even when h≠n. Thus, the operation A·B is performed efficiently as partitioned values of A are successively input.

The circuit of this embodiment a large number of PEs but can be realized by regularly arranging simple and identical PEs. Therefore it can be easily formed as a VLSI or the like. Also it can be realized very easily because the PEs can be controlled by the same control system and because data can be supplied in synchronization with each other by the same clock. Even if the number of figures of A or B is greatly increased, PEs may be annexed to perform the necessary operation. This type of multiplier circuit therefore has high extendability. Also, in this system, a carry from each PE is supplied to the next but one E in synchronization with clock, and the problem a delay relating to a carry, encountered in multiplication of integers, can therefore be avoided.

The present invention may be applied to any system or apparatus, e.g., a system formed of a plurality of units or an apparatus formed of one unit. Needless to say, the present invention can also be applied to a processing program supplied to a system or an apparatus.

The present invention makes it possible to provide an efficient, high-speed and extendible integer multiplier circuit which uses small-place multipliers while considering carries in a case where an operation is performed by partitioning an input value of many figures.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A multiplier apparatus for multiplying n-bit first data representing a first integer and (n×m)-bit second data representing a second integer, said apparatus comprising:

input means for successively inputting the first data bit by bit starting with the most significant bit;

a plurality of multiplication means each connected to said input means and for multiplying an input 1 bit and one of groups of m bits of the second data partitioned with respect to m bits each time 1 bit of the first data is input by said input means;

a plurality of memory means;

a plurality of first addition means each connected to one of said multiplication means and each for adding, respectively, an output from one of said plurality of multiplication means, less than all the bits of a value stored in a first one of said plurality of memory means including the least significant bit, and at least one of said plurality of first addition means further adding less than all the bits of a value stored in a second one of said plurality of memory means including the most significant bit, and each of said first addition means outputting a result of the addition to a third one of said plurality of memory means, each of said first addition means being connected to said one of said first and third one of said plurality of memory means and said at least one of said plurality of first addition means being connected to said second one of said plurality of memory means; and second addition means connected to at least a fourth one and a fifth one of said plurality of memory means and for adding an output from said fourth one of said plurality of memory means and less than all the bits of a value stored in said fifth one of said plurality of memory means including the most significant bit.

2. An apparatus according to claim 1, wherein each of said plurality of memory means stores a value of m+2 bits.

3. A multiplier apparatus for multiplying (n×m)-bit first data representing a first integer and (n×m)-bit second data representing a second integer, said apparatus comprising:

input means for successively inputting the first data m bits at a time starting with the most significant bit;

a plurality of multiplication means each connected to said input means and for multiplying input m bits and one of groups of m bits of the second data partitioned with respect to m bits each time m bits of the first data are input by said input means;

a plurality of memory means; and a plurality of addition means each connected to one of said multiplication means and each for adding, respectively, an output from one of said plurality of multiplication means, less than all the bits of a value stored in a first one of said plurality of memory means including the least significant bit, and all but a first one of said plurality of addition means further adding less than all the bits of a value output from another one of said plurality of addition means including the most significant bit, and all but a second one of said plurality of addition means outputting less than all the bits of a result of the addition including the least significant bit to a second one of said plurality of memory means, each addition means being connected to said first one of said plurality of memory means and said all but the first one of said plurality of addition means being connected to said another one of said plurality of addition means and said all but the second one of said plurality of addition means being connected to said second one of said plurality of memory means.

4. An apparatus according to claim 3, wherein each of said plurality of memory means stores a value of 2m bits.

5. A multiplier apparatus for multiplying (n×m)-bit first data representing a first integer and (n×m)-bit second data representing a second integer, said apparatus comprising:

input means for successively inputting the first data m bits at a time starting with the least significant bit;

a plurality of multiplication means each connected to said input means and for multiplying input m bits and one of groups of m bits of the second data partitioned with respect to m bits each time m bits of the first data are input by said input means;

a plurality of first memory means;

a plurality of addition means each connected to one of said multiplication means and each for adding, respectively, an output from one of said plurality of multiplication means, all the bits of a value stored in a first one of said plurality of first memory means, and a carry of a preceding addition, and all but one of said plurality of addition means outputting a result of the addition except for a carry to a second one of said plurality of first memory means, each addition means being connected to said first one of said plurality of first memory means and said all but one of said plurality of addition means being connected to said second one of said plurality of first memory means; and a plurality of second memory means for storing the carry output from one of said plurality of addition means and for feeding back the carry output to the one of said plurality of addition means which has output the carry at the time of a subsequent addition, each second memory means being connected to one of said plurality of addition means.

6. A multiplier apparatus for multiplying (n×m)-bit first data representing a first integer and (n×m)-bit second data representing a second integer, said apparatus comprising:

input means for successively inputting the first data m bits at a time starting with the most significant bit;

a plurality of multiplication means connected to said input means and each for multiplying input m bits and one of groups of m bits of the second data partitioned with respect to m bits each time m bits of the first data are input by said input means;

a plurality of memory means; and a plurality of addition means each connected to one of said multiplication means and each for adding, respectively, an output from one of said plurality of multiplication means, less than all the bits of a value stored in a first one of said plurality of memory means including the least significant bit, and all but one of said plurality of addition means further adding less than all the bits of a value stored in a second one of said plurality of memory means including the most significant bit, and each addition means outputting a result of the addition to said first one of said plurality of memory means, each addition means being connected to said first one of said plurality of memory means and said but one of said plurality of addition means being connected to said second one of said plurality of memory means.

7. A multiplier apparatus for multiplying (n×m)-bit first data representing a first integer and (n×m)-bit second data representing a second integer, said apparatus comprising:

input means for successively inputting the first data m bits at a time starting with the most significant bit;

a plurality of multiplication means each connected to said input means and for multiplying input m bits and one of groups of m bits of the second data partitioned with respect to m bits each time m bits of the first data are input by said input means;

a plurality of memory means; and a plurality of addition mean all but two of which are connected to two of said multiplication means and two of said plurality of memory means, and each for adding, respectively, an m-bit output from a first one of said plurality of multiplication means including the least significant bit, an m-bit output from a second one of said plurality of multiplication means including the most significant bit, less than all the bits of a value stored in a first one of said plurality of memory means including the least significant bit, and less than all the bits of a value stored in a second one of said plurality of memory means including the most significant bit, and for outputting a result of the addition to a third one of said plurality of memory means.

8. A multiplier apparatus for multiplying (n×m)-bit first data representing a first integer and (n×m)-bit second data representing a second integer, said apparatus comprising a set of p operational circuits, each of said p operational circuit including:

input means for successively inputting the first data m·p bits at a time, starting with the least significant bit as a set of p groups of m-bit data in parallel with each other;

a plurality of multiplication means connected to said input means, and for multiplying one of the set of p groups of input m-bit data and one of p groups of data in the second data grouped from data items partitioned from the second data with respect to m bits;

a plurality of memory means; and a plurality of addition means all of which other than lowermost and uppermost are connected to two of said plurality of multiplication means and two of said plurality of memory means, each of said plurality of addition means other than the lowermost adding a result of addition of a preceding one of said plurality of addition means, stored in a first one of said plurality of memory means and outputs from the two of said plurality of multiplication means each multiplying a series of bits in the second data, each of said plurality of addition means other than the uppermost outputting a result of the addition to a second one of said plurality of memory means, the obtained multiplication results being successively output by the lowermost addition means in each of said p operational circuits.

9. A multiplier apparatus for multiplying (n×m)-bit first data representing a first integer and (n×m)-bit second data representing a second integer, said apparatus comprising n identical processing elements connected one-dimensionally, each of said n identical processing elements including:

first input means for inputting respective ones of groups of m bits in the first data partitioned with respect to m bits, corresponding to each of said n processing elements;

second input means for successively inputting the second data, a group of m bits at a time starting with the most significant bit;

third input means for successively inputting a group of m bits at a time, said third input means inputting zero in the processing element at an uppermost stage of said apparatus, said third input means inputting the results of an operation of the processing element in a preceding stage in the processing elements other than the one at the uppermost stage;

multiplication means connected to said first and second input means, and for multiplying each of the groups of m bits of the second data successively input from said second input means and the respective ones of the groups of m bits of the first data input from said first input means;

addition means connected to said third input means and said multiplication means, and for adding the product obtained by said multiplication means to the value input from said third input means; and output means connected to said addition means and said second input means, and for successively outputting the results of said addition means as the result of the operation of one processing element and for outputting the groups of m bits of the second data successively input from said second input means, said output means outputting the result of the operation and the groups of m bits to a processing element at a succeeding stage of said apparatus in the processing elements other than one at the lowermost stage, said outpouring means outputting the results of the operation as the product of the first and second data from the processing element at the lowermost stage of said apparatus.

10. A multiplier apparatus for multiplying (n×m)-bit first data representing a first integer and (n×m)-bit second data representing a second integer, said apparatus comprising n×n identical processing elements connected in a two-dimensional array having n rows and n columns, each of said n×n identical processing elements including:

first input means for inputting respective ones of groups of m bits in the first data partitioned with respect to m bits, corresponding to each of the n columns of the two-dimensional array;

second input means for inputting respective ones of groups of m bits in the second data partitioned with respect to m bits, corresponding to each of the n rows of the two-dimensional array;

third input means for successively inputting a group of m bits at a time, said third input means inputting zero in the processing element in the first column or first row of the two-dimensional array, said third input means inputting the results of an operation of the preceding-row preceding-column processing element in the processing elements neither in the first column nor in the first row;

multiplication means connected to said first and second input means, and for multiplying a respective one of the groups of m bits of the second data input from said second input means and the a respective one of the groups of m bits of the first data input from said first input means;

addition means, connected to said third input means and said multiplication means, for adding the product obtained by said multiplication means and value input from said third input means;

first output means connected to said second input means, for successively outputting the second data successively input from said second input means to the same-row next-column processing element; and second output means connected to said addition means, for successively outputting results of said addition means as the results of the operation of one processing element, said second output means outputting the results of the operation to the next-row next-column processing element in the processing elements neither in th final column nor in the final row, and said second output means outputting the results of the operation as the product of the first and second data from the processing elements in the final column and the final row.

* * * * *

UNITED STATES PATENT AND TRADEMARK OFFICE
CERTIFICATE OF CORRECTION

PATENT NO. : 5,524,090  
DATED : June 4, 1996  
INVENTOR(S) : KEIICHI IWAMURA

Page 1 of 3

It is certified that error appears in the above-indentified patent and that said Letters Patent is hereby corrected as shown below:

Column 1,
    line 11, "an" should read --a--.

Column 2,
    line 6, "apparatus=" should read --apparatus--.

Column 3,
    line 35, "still still" should read --still--.
    line 40, "circuit" should read --circuits--.

Column 4,
    line 24, "rowxn" should read --row x n--.

Column 7,
    line 26, "$A_{-1} \cdot B_i$" should read --$A_{n-1} \cdot B_i$--.
    line 48, "Operational" should read --operational--.
    line 58, "complicate." should read --complicated--.

Column 10,
    line 33, "a groups" should read --a group--.
    line 64, "register ($R_{lib}$)," should read --register ($R_{li}$),--.

Column 11,
    line 27, "bit" should read --bits--.
    line 49, "+23)," should read --$+_{23}$),--.

UNITED STATES PATENT AND TRADEMARK OFFICE
CERTIFICATE OF CORRECTION

PATENT NO. : 5,524,090
DATED : June 4, 1996
INVENTOR(S) : KEIICHI IWAMURA

It is certified that error appears in the above-indentified patent and that said Letters Patent is hereby corrected as shown below:

Column 12,
    line 54, "i" should be deleted.

Column 13,
    line 64, "H∫n." should read --h≠ n.--.

Column 16,
    line 8, "Of" should read --of--;
    line 32, "in, n-1)" should read --(n, n-1)--.
    line 43, "The" should read --In the--, and "but" should be deleted.

Column 19,
    line 12, "mean" should read --means--.
    line 29, "circuit" should read --circuits--.
    line 32, "time,starting" should read --time starting--.
    line 61, "in,the" should read --in the--.

Column 20,
    line 27, "outpouring" should read --outputting--.
    line 56, "the a" should read --the--.

UNITED STATES PATENT AND TRADEMARK OFFICE
CERTIFICATE OF CORRECTION

PATENT NO. : 5,524,090
DATED : June 4, 1996
INVENTOR(S) : KEIICHI IWAMURA

It is certified that error appears in the above-indentified patent and that said Letters Patent is hereby corrected as shown below:

<u>Column 21,</u>
line 7, "th" should read --the--.

Signed and Sealed this

Fifth Day of November, 1996

Attest:

BRUCE LEHMAN

Attesting Officer       Commissioner of Patents and Trademarks